United States Patent
Shi et al.

(10) Patent No.: US 9,761,347 B2
(45) Date of Patent: Sep. 12, 2017

(54) PROCESS TO IMPROVE COVERAGE AND ELECTRICAL PERFORMANCE OF SOLID ELECTROLYTIC CAPACITOR

(71) Applicant: KEMET Electronics Corporation, Simpsonville, SC (US)

(72) Inventors: Yaru Shi, Simpsonville, SC (US); Antony P. Chacko, Simpsonville, SC (US); Hong Zhang, Jiangsu (CN); Qingping Chen, Simpsonville, SC (US); Randolph S. Hahn, Simpsonville, SC (US); Lei Xu, Jiangsu (CN); Yang Jin, Jiangsu (CN); Zhen Wu, Jiangsu (CN)

(73) Assignee: KEMET Electronics Corporation, Simpsonville, SC (US)

( * ) Notice: Subject to any disclaimer, the term of this patent is extended or adjusted under 35 U.S.C. 154(b) by 39 days.

(21) Appl. No.: 15/083,381

(22) Filed: Mar. 29, 2016

(65) Prior Publication Data
US 2016/0211082 A1 Jul. 21, 2016

Related U.S. Application Data

(60) Continuation-in-part of application No. 14/595,502, filed on Jan. 13, 2015, now Pat. No. 9,524,829, which is a division of application No. 13/896,672, filed on May 17, 2013, now Pat. No. 9,343,239, application No. 15/083,381, which is a continuation-in-part of application No. 14/672,292, filed on Mar. 30, 2015.

(51) Int. Cl.
*H01B 1/12* (2006.01)
*H01G 9/15* (2006.01)
*H01G 9/00* (2006.01)
*H01G 9/028* (2006.01)
*H01G 9/042* (2006.01)

(52) U.S. Cl.
CPC ........... *H01B 1/127* (2013.01); *H01G 9/0032* (2013.01); *H01G 9/0036* (2013.01); *H01G 9/028* (2013.01); *H01G 9/15* (2013.01); *H01G 9/0425* (2013.01); *Y10T 29/417* (2015.01)

(58) Field of Classification Search
None
See application file for complete search history.

(56) References Cited

U.S. PATENT DOCUMENTS

| | | |
|---|---|---|
| 7,411,779 B2 | 8/2008 | Merker et al. |
| D586,767 S | 2/2009 | Guerrero et al. |
| D599,309 S | 9/2009 | Guerrero et al. |
| 7,658,986 B2 | 2/2010 | Poltorak et al. |

(Continued)

FOREIGN PATENT DOCUMENTS

| | | |
|---|---|---|
| EP | 1524678 | 10/2004 |
| EP | 1746613 | 7/2006 |

(Continued)

*Primary Examiner* — Dion R Ferguson
(74) *Attorney, Agent, or Firm* — Joseph T. Guy; Perkins Law Firm, LLC

(57) ABSTRACT

A method for forming a capacitor, a capacitor formed thereby and an improved composition for a conductive coating are described. The method includes providing an anode, forming a dielectric on the anode and forming a cathode layer over the dielectric by applying an amine, a weak acid and a conductive polymer.

55 Claims, 10 Drawing Sheets

(56) References Cited

U.S. PATENT DOCUMENTS

| | | |
|---|---|---|
| D616,388 S | 5/2010 | Guerrero et al. |
| 8,771,381 B2 | 7/2014 | Chen et al. |
| 8,808,403 B2 | 8/2014 | Qiu et al. |
| 8,882,856 B2 | 11/2014 | Intelmann et al. |
| 2004/0085711 A1* | 5/2004 | Merker ............... C08G 61/126 361/523 |
| 2007/0171597 A1 | 7/2007 | Merker et al. |
| 2012/0057275 A1 | 3/2012 | Intelmann et al. |
| 2012/0206859 A1 | 8/2012 | Chacko et al. |
| 2014/0160632 A1 | 6/2014 | Chacko et al. |
| 2014/0340819 A1 | 11/2014 | Chacko et al. |
| 2015/0029642 A1 | 1/2015 | Shi et al. |
| 2015/0140203 A1 | 5/2015 | Intelmann et al. |

FOREIGN PATENT DOCUMENTS

| | | |
|---|---|---|
| EP | 2 950 316 A1 | 12/2015 |
| EP | 2 950 317 A1 | 12/2015 |

\* cited by examiner

PROCESS TO IMPROVE COVERAGE AND ELECTRICAL PERFORMANCE OF SOLID ELECTROLYTIC CAPACITOR

CROSS-REFERENCE TO RELATED APPLICATIONS

The present invention is a continuation-in-part application of pending U.S. patent application Ser. No. 14/595,502 filed Jan. 13, 2015 which is, in turn, a divisional application of pending U.S. patent application Ser. No. 13/896,672 filed May 17, 2013 both of which are incorporated herein by reference. The present application is also a continuation-in-part application of pending U.S. patent application Ser. No. 14/672,292 filed Mar. 30, 2015 which is incorporated herein by reference.

BACKGROUND

The present invention is related to an improved method for forming a capacitor and improved capacitors formed thereby. More specifically, the present invention is related to the use of weak acids, preferably in combination with amines and more preferably monoamines, as a coating additive particularly for intrinsically conductive polymers. Superior coverage of a surface, such as a dielectric, is provided thereby while maintaining superior electrical properties of the capacitor.

Solid electrolytic capacitors with conductive polymers as the cathode are widely used in the electronics industry, and elsewhere, because of their low equivalent series resistance (ESR) and "non-burning" healing mechanism. Typical methods for applying conductive polymers onto a dielectric include in situ chemical/electrochemical oxidation polymerization and coating of preformed conductive polymer dispersions or solutions. Compared with an in-situ polymerization method, coating of preformed conductive polymer is much simpler and less costly.

One particular concern with the conductive polymer coating process is the formation of a defect free polymer coating. As described in U.S. Pat. No. 7,658,986, a continuous coating of all dielectric surfaces by primary cathode materials is essential to prevent short circuit electrical failure. However, as with any coating process, surface tension of the conductive polymer dispersion could cause it to retreat from edges and corners during the drying process resulting in insufficient coverage in these areas. Corners and edges are most susceptible to mechanical or thermal mechanical stress during the capacitor manufacturing process. Without a sufficient polymer layer on the corners and edges of the dielectric in the poorly coated areas may be damaged and subsequent layers, such as carbon and metal layers, can come into direct contact with the dielectric leading to increased residual currents and other reliability issues.

One approach to improving edge and corner coverage is to modify the anode design as disclosed in U.S. Pat. Nos. 7,658,986; D616,388; D599,309 and D586,767. While this approach may be beneficial, it is not a universal method and has limits in practice.

Another approach mentioned by EP-A-1524678, EP-A-1746613 and U.S. Pat. No. 7,411,779 is to mix solid particles with the conductive polymer dispersion. The additional solid particles can be conductive or nonconductive. However, this approach is not always reliable and reproducible. The addition of solid particles often makes the polymeric coating layer brittle, and increases residual leakage and equivalent series resistance (ESR).

Yet another approach is described in WO201089777 and U.S. Pat. No. 8,882,856, which teach the use of a crosslinker solution applied between conductive polymer dispersion dipping cycles to improve polymer coverage of the corners and edges. The effectiveness of the crosslinker is attributed to the presence of multiple cationic functional groups that form a chemical bond, referred to as "crosslinks", between polymer dispersion particles. While crosslinking does improve coverage on the anode, the crosslinker solution may contaminate the conductive polymer dispersion which causes a viscosity increase of the conductive polymer dispersion. An ion exchange process has been suggested to remove the contamination from the polymer solution or dispersion, however, this adds to manufacturing complexity. Nonetheless, contamination of conductive polymer dispersion by the crosslinker causes more difficulties in process control, and in quality control and requires additional manufacturing steps.

The formed capacitor's initial electrical performance is good with the polyvalent crosslinkers described above. However, U.S. Pat. No. 8,808,403 and U.S. Publ. Pat. Appl. No. 2014/0340819 state that the performance deteriorates over time especially, under humid conditions. The reason is that these crosslinkers are often ionic materials that contain low molecular weight strong ionic species such as sulfate or p-toluenesulfonate. These strong ionic species can dissociate completely in the presence of water and can diffuse through various cathode layers under high humid conditions. The result is higher leakage current or even electrical short failures. This is unacceptable since high humidity is a very common environmental condition for capacitors. The migration of strong ionic species could also cause serious corrosion on certain metals, particularly aluminum. U.S. Pat. No. 8,808,403 suggests the use of a water wash step after the conductive polymer layer is dried to remove the ionic species from the cured conductivity layer. This approach suffers from other tradeoffs such as delamination of polymer from the dielectric, increased ESR and poor ESR stability. An additional washing step also requires a capital investment and is a detriment to manufacturing efficiency.

U.S. Publ. Pat. Appl. No. 2012/0206859 describes four different types of coverage enhancers including amino acids, amine-sulfonic acid salts, quaternary amine halide or sulfonate salts, and nanoparticles. The low molecular weight strong ionic species such as sulfonate and halides, increases the risk of poor leakage performance under humidity.

U.S. Publ. Pat. Appl. No. 2014/0340819 describes the use of diamines, triamines or polyamines in combination with weak acids, such as acids with a dissociation constant or pKa 0.25-6, as a crosslinker. This combination alleviates the corrosion on aluminum anodes, however, as long as a "crosslinker" is involved in the process, the contamination and viscosity increase of the conductive polymer dispersion or solution is still a problem.

Yet another problem with the cross-linkers is that each slurry layer tends to dry and form a skin. Subsequent layers then do not adequately migrate through the skin into previous layers and the layers are joined by adhesion not cohesion. The result is the formation of a cathode wherein discrete layers separate, or delaminate, under harsh conditions thereby decreasing conductivity between adjacent layers and increasing equivalent series resistance (ESR). The stability and reliability of capacitors made with the layered coating of conductive polymer is also undesirable.

U.S. Pat. No. 8,771,381 teaches the application of nonionic polyol prior to or in between conductive polymer dispersion layers to improve polymer corner and edge coverage. The capacitors are less susceptible to the corrosion caused by ionic species under high humidity conditions, however, the edge and corner coverage enhancement is still inferior.

In spite of the ongoing effort those of skill in the art still do not have a suitable option for the formation of polymer layers from a preformed dispersion which provides adequate coverage of the edges and corners and which is suitable for high humidity conditions. So a need still exists for materials and methods that improve corner and edge coverage of an anode without the negative effect on the leakage performance of the capacitor when exposed to humidity, or on the processability of the conductive polymer dispersion.

SUMMARY OF THE INVENTION

It is an object of the invention to provide an improved capacitor, and particularly capacitors which are not detrimentally impacted by adverse conditions with regards to capacitance or ESR performance.

It is another object of the invention to provide an improved method of manufacturing a capacitor which provides for adequate edge and corner coverage yet does not detrimentally impact the properties of the capacitor, such as capacitance and ESR, under adverse environmental conditions.

It is an object of the invention to provide an improved layer of intrinsically conducting polymer and a method for forming a conductive layer of intrinsically conducting polymer.

A particular feature of the invention is an improvement in coverage, particularly in the coverage of edges and corners, particularly of a dielectric.

It is another object of the invention to provide an improved capacitor formed by the improved layer of intrinsically conductive polymer.

These and other advantages, as will be realized, are provided in a process for forming a capacitor comprising:
providing an anode comprising a dielectric thereon;
applying a first layer of an intrinsically conducting polymer on the dielectric to form a capacitor precursor;
applying at least one subsequent layer of an intrinsically conducting polymer on the first layer from a dispersion; and treating the capacitor precursor at a temperature of at least 50° C. no more than 200° C. at a relative humidity of at least 25% up to 100%.

Yet another embodiment is provided in a process for forming a capacitor comprising:
providing an anode comprising a dielectric thereon;
applying a first layer of an intrinsically conducting polymer on the dielectric to form a capacitor precursor;
applying at least one subsequent layer of an intrinsically conducting polymer on the first layer from a dispersion thereby forming a layered structure;
fusing the layered structure by swelling the layered structure with a liquid and at least partially removing the liquid.

Yet another advantage is provided in a method for forming a capacitor. The method includes providing an anode, forming a dielectric on the anode and forming a cathode layer over the dielectric by applying a monoamine, a weak acid and a conductive polymer.

Yet another embodiment is provided in a capacitor. The capacitor comprises an anode with a dielectric at least partially encasing the anode. A cathode is on the dielectric wherein the cathode comprises an intrinsically conducting polymer, a weak acid and a monoamine.

Yet another embodiment is provided in a composition for the formation of a conductive coating comprising an intrinsically conducting polymer, a weak acid and a monoamine.

Yet another advantage is provided in a method for forming a capacitor comprising providing an anode; forming a dielectric on the anode; and forming a cathode layer over said dielectric by: applying an amine; applying a weak acid; and applying a conductive polymer.

Yet another embodiment is provided in a method for forming a capacitor comprising providing an anode; forming a dielectric on the anode; and forming a cathode layer over the dielectric by: applying an amine; applying a weak acid wherein the weak acid is not a carboxylic acid; and applying a conductive polymer.

Yet another embodiment is provided in A capacitor comprising an anode; a dielectric at least partially encasing the anode; and a cathode on the dielectric wherein the cathode comprises an intrinsically conducting polymer, a weak acid wherein the weak acid is not a carboxylic acid and an amine.

Yet another embodiment is provided in a process for forming a capacitor comprising providing an anode comprising a dielectric thereon; forming a conductive layer on the dielectric wherein the conductive layer comprises an intrinsically conducting polymer, a weak acid and an amine to form a capacitor precursor; applying at least one subsequent layer of an intrinsically conducting polymer on the first layer from a dispersion; and treating the capacitor precursor at a temperature of at least 50° C. to no more than 200° C. at a relative humidity of at least 25% up to 100%.

Yet another embodiment is provided in a process for forming a capacitor comprising providing an anode comprising a dielectric thereon; applying a first layer on the dielectric wherein the first layer comprises at least one of an intrinsically conducting polymer, a weak acid and an amine to form a capacitor precursor; applying a second layer on the first layer wherein the second layer comprises at least one of the intrinsically conducting polymer, the weak acid and the amine to form a layered structure; fusing the layered structure by swelling said layered structure with a liquid; and at least partially removing the liquid.

FIGURES

DESCRIPTION

The instant invention is specific to an improved method for forming a conductive coating and more particularly a conductive coating as the cathode of a solid electrolytic capacitor and an improved capacitor formed therewith. More specifically, the present invention is related to a method of forming a cathode of preferably preformed intrinsically conductive polymer comprising weak acids and preferably amines whereby the polymer coverage is improved without detrimental impacts on the electrical performance properties of the capacitor, especially, in the presence of high humidity. The present invention also provides a method of fusing conductive polymer layers by using high temperature and high humidity treatment, by soaking the layered structure in a liquid or solution, or by vapor treatment with some selected liquid that helps to swell and fuse the distinctive layers. This improves the bonding between adjacent layers of intrinsically conductive polymer.

Surprisingly, it has been found that improvements in the edge and corner coverage can be met by using amines, and preferably monoamines, which are acidified or neutralized with weak acids in the cathode layer of capacitors. This combination exhibits good polymer corner and edge coverage even though they may not crosslink the conductive polymer dispersion as was previously thought necessary.

A few monoamine compounds such as ammonium sulfate, trimethyloctadecylammonium bromide, ammonia, L-cysteine, L-methionine, and dimethyldioctadecylammonium bromide are mentioned in U.S. Pat. No. 8,882,856, and they all fail to improve corner and edge coverage adequately and were considered inferior to the inventive crosslinkers. These monoamine compounds were all used together with strong acids such as sulfuric acid or p-toluenesulfonic acid or contain anions of these strong acids and therefore have a pKa much lower than 0.25.

The invention will be described with reference to the various figures which form an integral non-limiting component of the disclosure. Throughout the disclosure similar elements will be numbered accordingly. In FIGS. 4-7, 9-10 and 12 light areas represent poor coverage as can be noticed, particularly, on the edges and corners.

Figure 1:
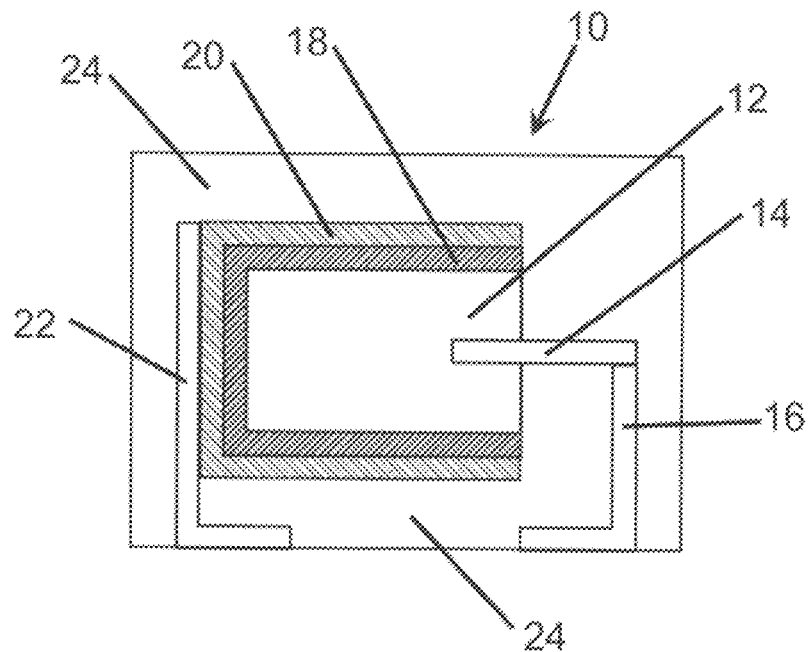
FIG. 1 is a schematic view of an embodiment of the invention.

An embodiment of the invention is illustrated in cross-sectional schematic side view in FIG. 1. In FIG. 1, a capacitor, generally represented at 10, comprises an anode, 12, with an anode lead wire, 14, extending therefrom or attached thereto. The anode lead wire is preferably in electrical contact with an anode lead, 16. A dielectric, 18, is formed on the anode and preferably the dielectric encases at least a portion, and preferably the entire, anode. A cathode, 20, is on the dielectric and encases a portion of the dielectric with the proviso that the cathode and anode are not in direct electrical contact. A cathode lead, 22, is in electrical contact with the cathode. In many embodiments it is preferable to encase the capacitor in a non-conductive resin, 24, with at least a portion of the anode lead and cathode lead exposed for attachment to a circuit board as would be readily understood by one of skill in the art. The cathode may comprise multiple sub-layers. The present invention is directed to improvements in the cathode layer, 20, and more particularly to the formation of an improved cathode layer.

Figure 2:
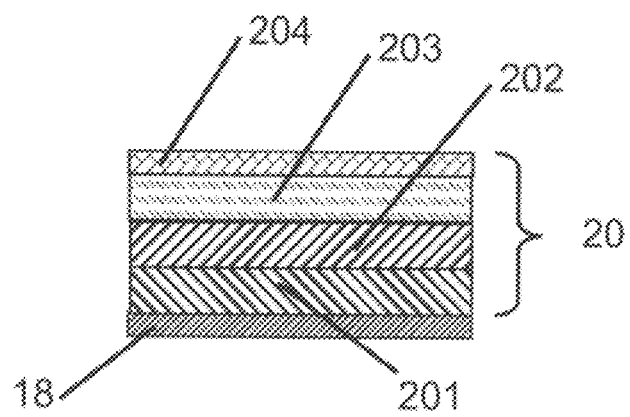
FIG. 2 is a schematic view of an embodiment of the invention.

An embodiment of the invention is illustrated in partial cross-sectional schematic view in FIG. 2. In FIG. 2, the cathode, 20, comprises multiple interlayers, 201-204, which are illustrated schematically, wherein the cathode is formed on the dielectric, 18. While not limited thereto the cathode interlayers are preferably selected from layers containing conductive polymer, carbon containing layers and metal containing layers most preferably in sequential order. In a particularly preferred embodiment a first interlayer, 201, is at least one conductive polymer layer formed either by in-situ polymerization or by repeated dipping in a preformed conductive polymer preferably in a carrier liquid, with at least partial drying between dips. It is well understood that soldering a lead frame, or external termination, to a polymeric cathode is difficult. It has therefore become standard in the art to provide conductive interlayers which allow for solder adhesion. A second interlayer, 202, which is preferably at least one carbon containing interlayer, is typically applied to the conductive polymer interlayer, 201. The carbon interlayer, or series of carbon interlayers, provides adhesion to the conductive polymer interlayer and provides a layer upon which a third interlayer, which is preferably at least one metal containing interlayer, 203, will adequately adhere. Particularly preferred metal containing layers comprise silver, copper or nickel. The metal interlayer allows external terminations, such as a cathode lead to be attached to the cathodic side of the capacitor such as by solder or an adhesive interlayer, 204. Each interlayer, though represented herein as a single layer, is typically formed from multiple applications of materials to form the interlayer. With particular reference to the conductive polymer interlayer, 201, the conductive polymer interlayer may be formed by the sequential formation of layers including the conductive polymer, amines and weak acids wherein any combination of the conductive polymer, amine and weak acid may be formed from a mixture thereof or each may be formed separately and sequentially. The amine is preferably a monoamine.

A particular advantage of the instant invention is the ability, but not the necessity, to form the cathode layer from a single composition. Prior art formulations typically rely on cross-linkers and/or strong acids, preferably applied prior to or between conductive polymer layers as a primer layer, to form intermolecular bonds. For anything larger than a laboratory scale coating these materials are applied separately to avoid premature reaction. Therefore, the conductive polymer layer and cross-linking or adhesion promoting layer require sequential application or the use of small batches of frequently replaced combinations neither of which is efficient. Even with sequential application cross-contamination of one component to the other often occurs as unreacted reagent may be carried from one application point to the other. With the instant invention the conductive polymer, mono-amine and weak acid can be in a common vessel for extended periods of time thereby allowing all three components to be applied in concert. This is a significant advantage with regards to manufacturing simplicity and there is no problem associated with carry-over contamination.

Figure 3:
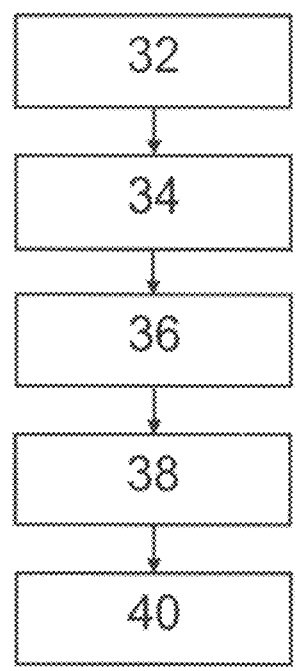
FIG. 3 is a flow chart representation of an embodiment of the invention.

An embodiment of the invention is illustrated in flow chart form in FIG. 3. In FIG. 3, the method of forming a solid electrolytic capacitor of the instant invention is illustrated. In FIG. 3, an anode is provided at 32. A dielectric is formed on the surface of the anode at 34 with a particularly preferred dielectric being the oxide of the anode. A cathode layer is formed at 36 wherein the cathode preferably comprises multiple interlayers. Interlayers may include at least one conducting polymer layer wherein the intrinsically conducting polymer is either formed in-situ or the layer is formed by coating with a preformed intrinsically conducting polymer preferably in a carrier liquid. The interlayers also preferably comprise at least one carbon containing layer and at least one metal containing layer. Anode and cathode leads are attached to the anode and cathode respectively at 38 and the capacitor is optionally, but preferably, encased at 40 and tested.

Figure 15:
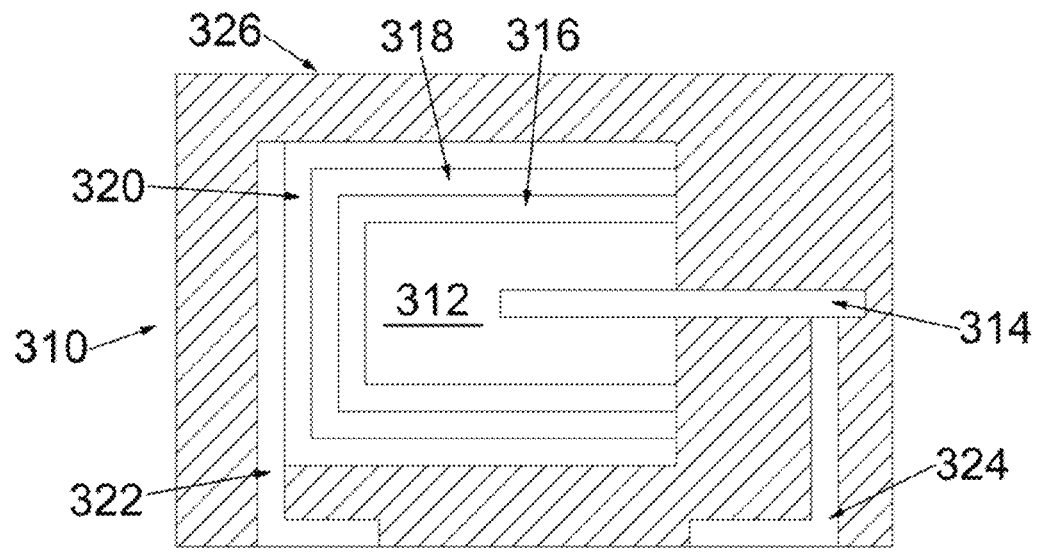
FIG. 15 is a cross-sectional schematic view of an embodiment of the invention.

An embodiment of the invention is illustrated in schematic cross-sectional view in FIG. 15. In FIG. 15, a capacitor, generally represented at 310, comprises an anode, 312, with an anode wire, 314, extending therefrom. A dielectric, 316, is on the anode and at least partially encases the anode. A conductive polymeric cathode, 318, is on the dielectric and separated from the anode by the dielectric. Adhesion layers, 320, provide a layer which allows adhesion to a cathode external termination, 322. An anode external termination, 324, is in electrical contact with the anode wire. The entire capacitor, except for the lower portion of the anode and cathode external terminations, is preferably encased in a non-conductive matrix, 326, or sealed in a hermetically sealed container as known in the art.

Figure 16:
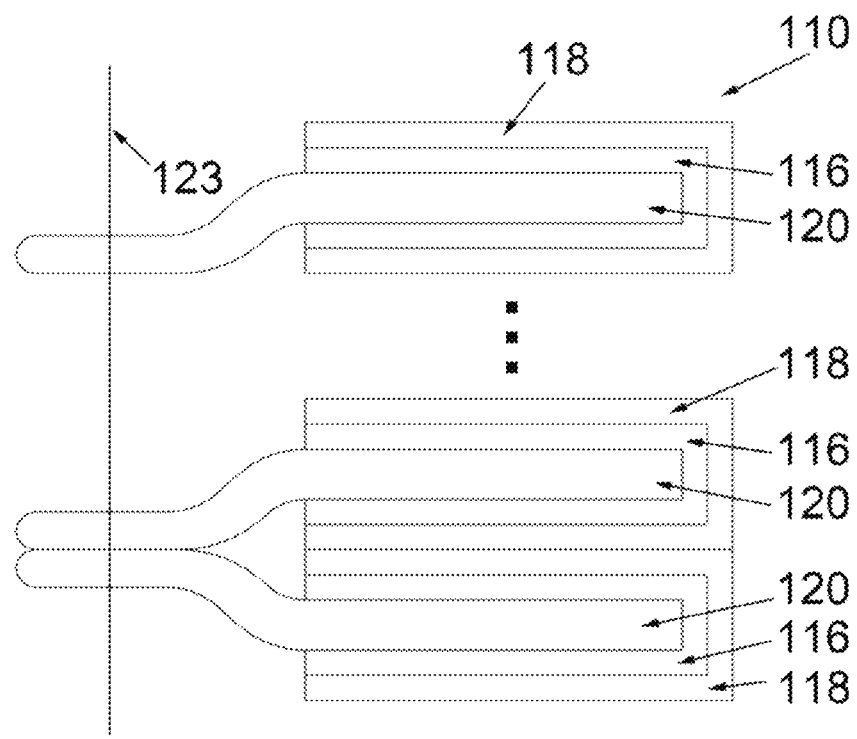
FIG. 16 is a cross-sectional schematic partially-exploded view of an embodiment of the invention.

An embodiment of the invention is illustrated in FIG. 16 wherein a capacitor is generally represented at 110. A series of anodes, 120, are arranged in parallel fashion. Each anode has a dielectric, 116, thereon. A conductive polymer cathode, 118, is on each dielectric. The anodes are fused at 123 and the cathodes are commonly terminated.

The present invention provides a method for fusing conductive polymer layers by using high temperature and high humidity treatment, by soaking the layered structure in a liquid or solution, or by vapor treatment with some selected liquid that helps to swell and fuse the distinctive layers. This improves the bonding between adjacent layers of intrinsically conductive polymer and results in improved ESR and ESR stability.

Figure 17:
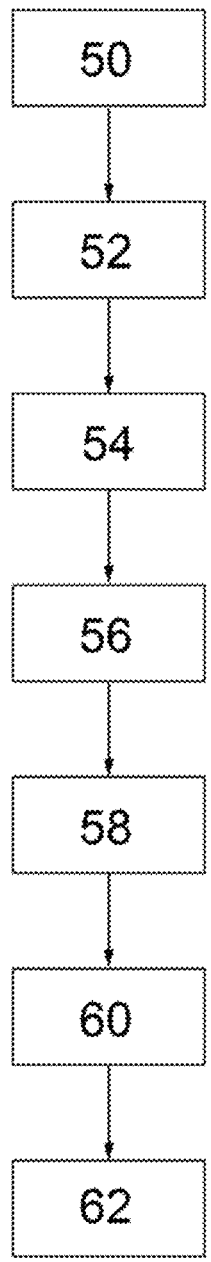
FIG. 17 is a flow chart representation of an embodiment of the invention.
Figure 18:
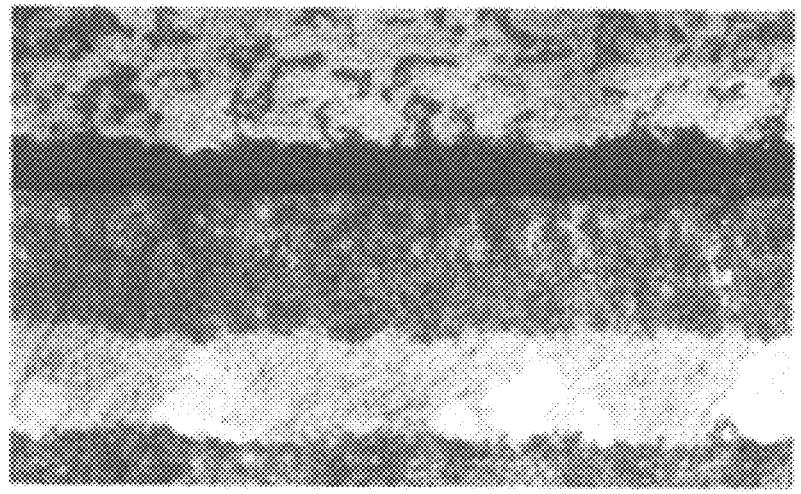
FIG. 18 is a cross-sectional view of a cathode layer without inventive treatment.
Figure 19:
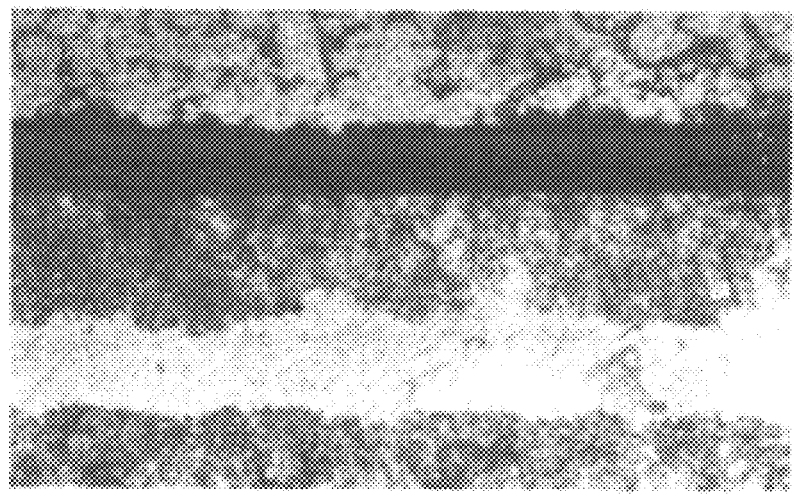
FIG. 19 is a cross-sectional view of a cathode layer with inventive treatment.

An embodiment of the invention is illustrated in flowchart form in FIG. 17. In FIG. 17, an anode is provided at 50. A dielectric is formed on the anode at 52. An initial coating of primer is applied at 54 followed by coating with a conductive polymer, preferably as a slurry, at 56. Subsequent layers are applied at 58. At least two polymer coatings are applied with the number based on the desired thickness and completeness of coverage. A particularly preferred conductive polymer is poly 3,4-ethylenedioxythiophene (PEDT). PEDT slurry is commercially available from Heraeus as Clevios® KV2. The layers are dried and then fused at 60, preferably, at a temperature of at least 50° C. to no more than 200° C. and a relative humidity of at least 25-100%. More preferably the temperature is at least 115° C. to no more than 130° C. More preferably the relative humidity is at least 75%. Once the desired thickness and coverage of conductive polymer is achieved the capacitor is finished at 62 by forming anodic and cathode external terminations and optionally encapsulating or sealing the capacitor.

While not limited to any theory, it is hypothesized that the moisture swells the layers and that upon heating the layers are more intimately bound or fused to form a more homogenous coating with indistinguishable striations.

In another embodiment the layered structure can be treated with a liquid, preferably a polar liquid, which enhances the swelling. Particularly preferred liquids for swelling the layered structure includes water; alcohol such as ethanol or isopropanol; ketones such as acetone or methyl ethyl ketone; esters such as ethyl acetate, isoamyl acetate or ring based polar solvents such as tetrahydrofurane (THF); ethylene glycol; propylene glycol; glycerol; dimethyl sulfoxide (DMSO); N-methyl pyrrolidone or N, N-dimethylformamide (DMF); polar solid compounds such as polyols including sorbitol, mannitol, sucrose and lactose and amino acids including glycine, alanine and lysine or mixture of these solvents. Treatment is preferably done by dipping due to the manufacturing efficiency provided thereby with other techniques, such as spraying, being suitable for demonstration of the invention. After sufficient treatment to achieve swelling the liquid is removed by either reduced pressure, increased temperature or some combination thereof at a rate sufficient to avoid surface drying or skinning. The temperature is preferably no more than the boiling point of the liquid even though this temperature can be exceeded if surface drying is not caused by the more rapid liquid removal. Temperatures of 25° C. to 150° C. are suitable for demonstration of the invention with glycerol.

In yet another embodiment the layered structure can be treated with vapor of any liquid or solute mentioned in the above embodiment. Heat can be optionally applied to speed up the swelling and fusing of conductive polymer layers.

The conductive polymer dispersion is applied onto the primer to form a layer that covers the edges and corners of the anodes. The primer further preferably comprises a cross-linker and a weak ionic acid counter-ion. The application of primer layer and the conductive polymer layer can be repeated multiple times to achieve enough thickness and completeness of coverage. Without limit thereto 2-10 cycles of primer and conductive polymer layer application are suitable for demonstration of the invention. Each application of conductive polymer may use a unique composition and a unique solution or an identical or similar material may be used for the various dipping steps. A preferred thickness of the conductive polymer layer is at least 2 micrometers to no more than 50 micrometers. A more preferred thickness of the conductive polymer layer is from at least 2 micrometers to no more than 40 micrometers. An even more preferred thickness is from at least 3 micrometers to no more than 30 micrometers. If the layer of conductive polymer is below about 2 micrometers the dielectric is not adequately covered resulting in defective capacitors. If the conductive polymer layer is over about 50 micrometers the equivalent series resistance of the resulting capacitor is compromised.

Typical primers, particularly, and cross-linkers are known to be detrimentally impacted by moisture due, presumably, to their ionic nature. Aluminum is particularly known to be detrimentally impacted by the presence of moisture. It has therefore been considered necessary to avoid high moisture conditions during the manufacture of capacitors utilizing intrinsically conducting polymer due to the presence of the primers specifically. In a surprising development, the use of relatively high moisture and heat, as set forth elsewhere herein, fuses adjacent layers of the intrinsically conductive polymer thereby achieving superior properties, particularly ESR, of the resultant capacitor. This result is contrary to the expectation of those of skill in the art. The surprising realization that moist heat improves inter-layer bonding within the layers of intrinsically conducting polymer allows for the use of previously unsuitable weak counter ions thereby greatly improving the reliability characteristics of the capacitor. The result is a capacitor with improved stability upon aging and subsequent use.

The cross-linker is preferably a diamine, triamine, oligoamine or derivatives thereof wherein oligoamine refers to compounds comprising at least four amine groups such as tetramine, pentamine, hexamine, heptamine, octamine, nonamine, decamine, undecamine, dodecamine, etc. Particularly preferred amines are selected from aliphatic amines, amides, aromatic amines, amino acids, polymeric amines, and polyether amines.

Aliphatic amines including α,ω-diamines such as 1,4-diaminocyclohexane or 1,4-bis aminomethyl(cyclohexane), or

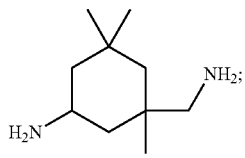

linear aliphatic α,ω-diamines or derivatives thereof such as ethylenediamine, 1,6-hexanediamine, 1,7-heptanediamine, 1,8-octanediamine, 1,9-nonanediamine, 1,10-decanediamine or 1,12-dodecanediamine N,N-dimethylethylenediamine, N,N,N'N'tetramethyl-1,4,butanediamine, N,N,N, N'N'N-hexamethylhexanemethylene-diammonium dibromide, piperazine, 1,4-diazabicyclo[2.2.2]octane, N,N, N'N-tetrakis(2-hydroxypropyl)ethylenediamine, N-[3-(trimethoxysilyl)propyl]ethylenediamine or 1,4-bis(3-amino-propyl)piperazine; amides such as N,N'-diacetyl-1,6-hexanediamine, N,N,N'N'-tetraacetylethylene-diamine, 1,4-diformylpiperazines or N,N'-ethylenebis(stearamide); aliphatic amines, including linear aliphatic amines, having at least three amino groups such as 1,4-bis(3-aminopropyl) piperazine, N-(6-aminohexyl)-1,6-diaminohexane or N-(3-aminopropyl)-1,4-diaminobutane or 3-[2-(2-aminoethyl-amino)ethyleneamino]propyltrimethoxysilane; aromatic amines having at least two amino groups such as brilliant green, 4,4'-methylenebis(N,N-diglycidylaniline), o-phenylene-di-amine, m-phenylenediamine, p-phenylenediamine, 1,5-diaminonaphthalene, 1,8-diaminonaphthalene, 2,3-diaminonaphthalene, 3-aminophenyl sulfone, 4-aminophenyl sulfone, 4-aminophenyl ether, 3-3'-diaminobenzidine, 2-(4-aminophenyl)ethylamine, 4,4'-methylenendianiline, 2,6-diamiotoluene, N,N,N'N'-tetramethyl-p-phenylenediamine, 4,4'-bis(diethylamino)benzophenone, 4,4'-bis(dimethyl-amino)benzhydrol, 3,3',5,5'-tetramethylbenzidine, Auramine O, Rubine S, m-xylenediamine, phthalein, complexone, Brilliant Blue G, folic acid; aromatic triamines such as 4,4',4''-methyliditetris (N,N-dimethylaniline); polymeric amines such as poly(propylene glycol)bis (2-aminopropyl) ether, polyethyleneimine and poly(allylamine), ethoxylated polyethyleimine; and polyethers such as $NH_2$—$(CH_2)_x(CH_2CH_2O)_y(CH_2)_z$—$NH_2$, wherein x and z are an integer from 0 to 3 and y is an integer from 2 to 8, and imidazole derivatives.

HAST is Highly Accelerated Stress Test wherein a sample can be tested for corrosion resistance under electrical bias at 121° C. and 85% RH. HAST testing typically requires about 1-200 hours. For the purposes of the instant disclosure b-HAST refers to a test under electrical bias and ub-HAST is the same test without electrical bias.

Figure 4:
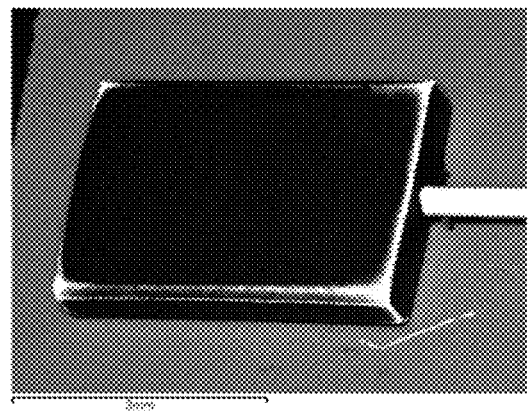
FIG. 4 illustrates the polymer coverage of a comparative example.
Figure 5:
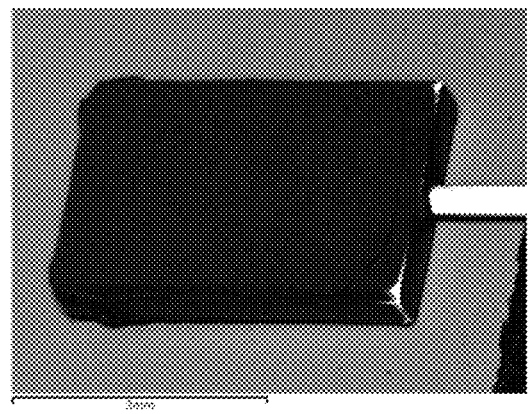
FIG. 5 illustrates the polymer coverage with an inventive example.

A surprising result is presented in the present disclosure. When weak ionic counter ions, as defined elsewhere herein, are utilized especially with the cross-linker the initial results are negative in that the ESR rises to an unacceptable level even though superior covering of the dielectric is observed. This has led to those of skill in the art avoiding weak counterions. It is surprisingly found that by the application of moist heat at a temperature and humidity as set forth elsewhere herein the ESR lowers to a level which is comparable to prior art wherein strong acid counter-ions are used. While not limited to the theory, the improved treatment is thought to improve inter-layer adhesion. FIG. 4 illustrates a cross-sectional view of the intrinsically conducting polymeric cathode layer, coated using conventional Clevious® K Primer W, in a solid electrolytic capacitor treated by conventional drying techniques. Inter-layer striations are easily observed which are believed to separate upon aging. FIG. 5 illustrates an identically prepared layer treated at 121° C. in 85% relative humidity wherein the striation is not observed and the intrinsically conductive polymer layer appears to be a continuous layer which does not as easily delaminate upon aging.

Moist heat, especially with aluminum, has long been considered detrimental due to anode degradation. It is surprisingly found that with weak ionic counterions moist heat can be used, preferably with a post heating step, to provide an improved capacitor exhibiting relatively low ESR, good stability during manufacturing process and low leakage current with aluminum anodes as well as improved reliability. The anode does not suffer from corrosion as is commonly realized with prior art strong acid counterions. In yet another surprising result, when the inventive capacitor is subsequently dried, the ESR and leakage current remain low during subsequent processing.

The unique combination of specifically selected weak ionic counterions, and specific processing conditions, provides a capacitor with a low ESR, uniform cathode deposition, minimal anode corrosion even under harsh conditions and the ESR and leakage current remain low during subsequent processing. Such a combination of advantages is difficult to otherwise achieve in the art.

Though not limited to theory, experimental evidence suggests that the combination of the cross-linker and weak ionic counter ion react to form an uncharacterized product which improves adhesion, or cohesion, within the layer of the conductive polymer layer. Through designed experiments with dodecylamine and butanetetracarboxylic acid following treatment as described elsewhere herein a thermal analysis indicates melting properties which are not consistent with either the dodecylamine or the butanetetracarboxylic acid.

After the final conductive polymer coating is applied the coated element may be subjected to further processing steps such as solvent treatment, or humidity treatment before or after carbon and silver coating. Preferred solvents for solvent treatment are water or other polar solvents such as methanol, ethanol, propanol, butanol, ethylene glycol, propylene glycol, glycerol, ethylene carbonate, propylene carbonate, acetonitrile, dimethylsulfonixide, dimethylformaide, dimethoacetamide, N-methylpyrrolidone, ethers, tetrahydrofuran, caprolactone, butyrolactone, etc. More preferred are mixture of water and the abovementioned polar solvents. The application of amines, preferably monoamines, or weak acids can be combined with the solvent treatment process as one step.

The conductive polymer layer may be formed in a single step wherein at least the conductive polymer and optionally the monoamine and weak acid, along with any adjuvants such as binder, dopant, solvent and the like are applied, preferably in a carrier liquid thereby forming a solution, slurry or dispersion. Alternatively, the conductive polymer layer may be formed in multiple steps wherein components of the layer are applied separately. In one embodiment a conductive polymer layer is coated before or after coating of the amine and weak acid either together or separately. In another embodiment the conductive polymer is applied in concert with one of the amine or the weak acid followed by application of the other of the amine or weak acid. In a preferred embodiment the polymer is applied separately with a combination of the weak acid and amine applied before and/or after the polymer application with each layer repeated alternately until sufficient polymer thickness is achieved. In another preferred embodiment, the polymer is applied in concert with both the amine(s) and the weak acid(s) preferably in a carrier liquid. In a particularly preferred embodiment the polymer and amine are alternately applied followed by a final coating of the weak acid. Applying the different components in concert is beneficial since it reduces the number of processing steps and improves manufacturing efficiency. Prior art methods typically require multiple dip cycles wherein each dip is into either a single component of some combination of components selected from oxidizer, monomer precursor of conductive polymer, conductive polymer, cross-linker and the like. Some combinations are preferably avoided such as oxidizer and monomer or crosslinker and polymer due to concerns related to premature reaction. In reality, crossover of the components from one dip is often carried over to subsequent dips as complete avoidance of this is very difficult. Therefore, each dip may likely contain some level of components from a previous dip which may be tolerated or, in some cases, advantageous at certain levels.

The cathode is a conductor preferably comprising a conductive polymeric material. Particularly preferred conductive polymers include intrinsically conductive polymers most preferably selected from polypyrrole, polyaniline and polythiophene. The cathode may include multiple interlayers wherein adhesion layers are employed to improve adhesion between the conductor and the termination. Particularly preferred adhesion interlayers include carbon, silver, copper, or another conductive material in a binder. The cathode is preferably formed by dipping, coating or spraying either conductive polymer or a conductive polymer precursor which is polymerized by an oxidant as known in the art with the polymer or precursor preferably in a carrier liquid. For the purposes of the instant invention it is preferable to apply layers of preformed conductive polymer such as in a slurry. Carbon and metal containing layers are typically formed by dipping into a carbon containing liquid or by coating. The carbon containing layers and metal containing layers can be formed by electroplating and this is a preferred method, in one embodiment, particularly for the metal containing layer.

The conductive polymer has a backbone defined as $-(CR^1R^2-CR^3R^4-)_x-$ wherein at least one of $R^1$, $R^2$, $R^3$ or $R^4$ comprises a group selected from thiophene, pyrrole or aniline which may be substituted. Subscript x is at least 2 to no more than 1000. None of $R^1$, $R^2$, $R^3$ or $R^4$ contain —SOOH or COOH. Hydrogen and lower alkyls of less than five carbons are particularly suitable. Thiophenes are particularly preferred with poly(3,4-ethylenedioxythiophene) being most preferred.

Conductive polymers are particularly suitable for use as the electrically conductive solid cathode with polyaniline, polypyrroles and polythiophenes being most preferred. A particularly preferred polymer for use as a cathode is polythiophene. The polymer layer inside the pores can be formed by chemical polymerization wherein the internal conductive layer is formed by dipping the anodized substrate first in a solution of monomer of the conductive polymer. After a drying step, the anode bodies are then immersed in a solution comprising oxidizer and dopant. The chemical polymerization cycle can be repeated multiple times to achieve the desired coverage of the surface inside the pores. The polymer layer inside the pores can also be formed by dip coating using a solution or dispersion of conductive polymer. When a solution of conductive polymer is utilized a diluted solution is preferred so that the solution viscosity would be sufficiently low to allow diffusion of the solution into the porous structure. In case of a dispersion of the conductive polymer the particle size must be sufficiently small to allow impregnation of the porous structure.

The conducting polymer is preferably an intrinsically conducting polymer comprising repeating units of a monomer of Formula I:

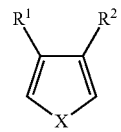

Formula I $R^1$ and $R^2$ of Formula I are preferably chosen to prohibit polymerization at the β-site of the ring. It is most preferred that only α-site polymerization be allowed to proceed. Therefore, it is preferred that $R^1$ and $R^2$ are not hydrogen. More preferably $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula I, X is S, Se or N. Most preferably X is S.

$R^1$ and $R^2$ independently represent linear or branched $C_1$-$C_{16}$ alkyl or $C_1$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR_3$; or $R^1$ and $R^2$ taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R_3$ preferably represents hydrogen, linear or branched $C_1$-$C_{16}$ alkyl or $C_1$-$C_{18}$ alkoxyalkyl; or are $C_3$-$C_8$ cycloalkyl, phenyl or benzyl which are unsubstituted or substituted by $C_1$-$C_6$ alkyl.

More preferably $R^1$ and $R^2$ independently represent —$CH_3$, —$CH_2CH_3$; —$OCH_3$; —$OCH_2CH_3$ or most preferably $R^1$ and $R^2$ are taken together to represent —$OCH_2CH_2O$— wherein the hydrogen can be replaced with a solubilizing group, a halide or an alkyl.

In one embodiment the conductive polymer layer is applied with a carrier liquid, such as in a slurry, wherein the conductive polymer and carrier liquid are applied to a surface by dipping or coating. The slurry comprises a solvent, preferably water and the conductive polymer is preferably poly(3,4-ethylenedioxythiophene). The carrier liquid is preferably a polar solvent, such as water, alcohol or acetonitrile or a mixture of water with polar solvent, with water being the most preferred solvent. The carrier liquid is in sufficient ratio to achieve a viscosity suitable for achieving an adequate coating with additional solvent being undesirable as the solvent is typically removed after application.

A solvent is defined as a single solvent or a mixture of solvents.

The conductive polymer may be applied as a solution or dispersion in water or other solvents. The particle size of the conductive polymer can be small or large, preferably ranging 1 nm-20 microns The first layer of conductive polymer solution or dispersion, once being applied by spraying, coating, etc, may be subjected to evaporating, heating or reduced pressure to at least partially remove the carrying liquid. But it is also possible to apply following layers of conductively polymer solution or dispersion, amine, weak acid or amine/weak acid combination without removing the carrying liquid from the $1^{st}$ layer of conductive polymer solution or dispersion.

Conductive polymers, especially thiophenes, have a counter ion associated therewith. Counterions with low mobility are particularly preferred since they are less susceptible to migration, especially, under humid conditions. For this reason polymeric counterions have proven to be most effective. A particularly suitable counterion, particularly for polythiophene is polystyrene sulfonic acid (PSSA) since it has limited mobility and PSSA is now recognized as a preferred counterion. A layer of conductive polymer can be applied with a slurry or dispersion of the conductive polymer. It is preferred to include a dopant in the polymer as known in the art. A particularly preferred dopant is the sodium salt of polystyrenesulfonate (PSS) or polyestersulfonate (PES).

The polymer solution or dispersion may also comprise additional additives such as crosslinkers, binders, surfactants, and adhesion promoters.

A particularly preferred adhesion promoter is an organofunctional silane. The organofunctional silane adhesion promoter can be applied before, or after, the conductive polymer layer to benefit binding of the conductive polymer layer and also to improve corner and edge coverage. Preferred organofunctional silanes are epoxy, hydroxyl, amine, imidazole, carboxylate, phosphonate, sulfonate, phosphate, ester, vinyl, acrylate, methacrylate, functionalized silanes, such as 3-glycidoxypropyl-trialkoxysilane, 3-aminopropyl-triethoxysilane, bis(2-hydroxyethyl)3-aminopropyltriethoxysilane, N-(3-triethoxysilylpropyl)-4,5-dihydroimidazole, N-(3-triethoxysilylpropyl)gluconamide, carboxyethylsilanetriol, 3-(trihydroxysilyl)-1-propane sulfonic acid, 3-(trihydroxysilyl)propyl methylphosphonate, (2-diethylphosphato-ethyl)triethoxysilane, 3-mercaptopropyltrimethoxysilane, vinyltrimethoxysilane, 3-methacryloyloxy-propyltrimethoxysilane, etc.

Particularly preferred amines for use in conjunction with the conductive polymer are monoamines. Monoamines include any compounds containing only one amine functionality with a formula of $R^1NH_2$, $R^1R^2NH$, or $R^1R^2R^3N$ wherein $R^1$, $R^2$, $R^3$ independently may be alkyl, aromatic moieties containing other functional groups such as hydroxy, thiol, sulfide epoxy, ether, carbonyl, ester, acetal, amide, imide, nitrate, phosphonate, phosphate, hydrocarbyls or carboxylic with the proviso that none of $R^1$, $R^2$ or $R^3$ are an amine, a phosphonium, a sulfonium or any strong acid groups such as certain kinds of sulfuric, sulfonic, nitric, or halides, that has a pKa below 0.25 in water. More preferably, $R^1$, $R^2$, $R^3$ independently may be alkyl, aromatic moieties containing other functional groups such as hydroxy, thiol, sulfide epoxy, ether, carbonyl, ester, acetal, amide, imide, nitrate, phosphonate, phosphate or hydrocarbyls. Example of monoamines include: ammonia (ammonium hydroxide), ethylamine, diethylamine, triethylamine, propylamine, dipropylamine, tripropylamine, isopropylamine, diisopropylamine, butylamine, tripropylamine, dibutylamine, tributylamine, isobutylamine, diisobutylamine, triisobutylamine, methylethylamine, pentylamine, hexylamine, octylamine, decylamine, allylamine, ethanolamine, diethanolamine, triethanolamine, methylethanolamine, butylethanolamine, cyclohexylethanolamine, cyclohexyldiethanolamine, N-ethylethanolamine, N-propylethanol amine, tris(hydroxymethyl)aminomethane, bis(2-hydroxyethyl)amino-tris (hydroxymethyl) methane, 3-amino-1-propanol, amino-2-propanol, diisopropanolamine, triisopropanolamine, 5-amino-1-pentanol, 6-amino-1-hexanol, pyridine and derivatives, aniline and derivatives, methyl-aniline, nitro-aniline, 1-naphthylamine, 2-naphthylamine and glucosamine. The pKa of the monoamine in water is preferably 30 or above. It is most preferred that the monoamines contain at least one hydroxy functional groups.

Due to the non-crosslinking nature of the preferred monoamine-weak acid combinations, they do not cause an increase in viscosity or agglomeration of the conductive polymer dispersion or solution. Since the monoamine-weak acid combinations contain only weak ionic bonds, the capacitors thus made demonstrate excellent leakage performance under high humidity conditions even without a water washing step. They are also less corrosive on metals, such as aluminum, than coverage enhancing agents that contain strong ionic bonds. Weak acids are ionic counterions defined herein as inorganic or organic acids with dissociation constant (pKa) of at least 0.25 to no more than 10 measured as a monomer in water. The preferred pKa range of the weak acid is 1-7 and the most preferred range is 2-6. More preferably the weak ionic acid counterion has a pKa of at least 2.15 to no more than about 6. Below a pKa of about 0.25 the finished part fails in accelerated reliability test. Above a pKa of about 6 the ionic acid is insufficiently ionic to function as a suitable counterion. It may contain one, two, three or even more acid functionalities. The weak acid may contain other functionalities such as hydroxy, thiol, epoxy, with the proviso that the weak acid does not contain an amine. Carbonic acid, boric acid, phosphoric acid, phosphonic acids, carboxylic acids such as acetic acid, acrylic acid, benzoic acid, malonic acid, maleic acid, succinic acid, glutaric acid, adipic acid, sebacic acid, phenol, benzoic acid, phthalic acid, 2,2-bis(hydroxymethyl)propionic acid (dimethylolpropionic Acid, Bis-MPA), citric acid, trimesic acid, butanetetracarboxylic acid and polyacrylic acid particularly suitable for demonstration of the invention with carboxylic acid, phosphoric acid and phosphonic acids being most preferred. By avoiding harsh chemical/electrochemical reactions on the dielectric, the inventive method demonstrates some unique advantages such as superior high voltage performance, reduced DC leakage and improved long term stability. Strong acids with pKa lower than 0.25, such as sulfuric acid, sulfonic acid, nitric acid, hydroiodic acid, hydrochloric, hydrobromic, etc. are not appropriate for demonstration of the invention due to poor performance, particularly in high humidity condition. In a particularly preferred embodiment the weak ionic acid counterion comprises multiple carboxylic acid groups and has a preferred pKa of at least 0.25 to no more than about 6. Acids containing multiple carboxyl groups on a linear or branched hydrocarbon of at least one to 20 carbons, are particularly preferred. Above about 20 carbons the solubility of the weak ionic acid counterion becomes limiting. A particularly preferred weak ionic acid counterion is selected from the group consisting of acetic acid, 1,2,3,4-butanetetracarboxylic acid, lysine and butanetetraacetic acid. In another embodiment the weak acid does not include a carboxylic acid group.

The amines, weak acids, or amine-weak acid combinations are preferably applied with a carrier liquid such as in a solution or dispersion. It may also include other additives to increase the solubility of the amine-acid combination in solution. Preferred solvents are water or other polar solvents such as alcohols. Mixtures of water and polar solvents, which are miscible with water, are also appropriate.

The ratio of amine and weak acid can vary. It is preferred that the amine and weak acid ratios be adjusted so the pH of the amine-weak acid combination is between pH 1.5-10, more preferably pH 2-7.

The concentration of the amine-weak acid in the solution or dispersion is not limited but it is preferred to be at least 0.001 molar to achieve the benefit of coverage enhancement.

Ammonium salts are widely used in traditional aluminum electrolytic capacitors as a solute in liquid electrolyte. For edge and corner coverage improvement of solid capacitors, a preferred way is to apply a coating of amine-weak acid combination, preferably in a carrier solution, prior to or in between, conductive polymeric coatings. It is hypothesized that the hydrophilic and ionic interaction between the amine-weak acid and the conductive polymer particles slows down the retreating of the polymer dispersion frontier from the edges and corners during the polymer drying step. Another preferred method is to use the amine-weak acid as an additive in the conductive polymer dispersion.

It is preferable to apply the dispersion comprising the conductive polymer at a pH of no more than 10 and more preferably no more than 8 with below 7 being more preferred and below 6 being especially preferred.

The anode is a conductor preferably selected from a metal or a conductive metal oxide as a porous foil or monolith. More preferably the anode comprises a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. An anode consisting essentially of Ta and Al is most preferred.

The dielectric is a non-conductive layer which is not particularly limited herein. The dielectric may be a metal oxide or a ceramic material. A particularly preferred dielectric is the oxide of a metal anode due to the simplicity of formation and ease of use. The dielectric is preferably formed by dipping the anode into an anodizing solution with electrochemical conversion. Alternatively, a dielectric precursor can be applied by spraying or printing followed by sintering to form the layer. When the dielectric is an oxide of the anode material dipping is a preferred method whereas when the dielectric is a different material, such as a ceramic, a spraying or coating technique is preferred.

The anode lead wire is chosen to have low resistivity and to be compatible with the anode material. The anode lead wire may be the same material as the anode material or a conductive oxide thereof. Particularly preferred anode lead wires include Ta, Nb and NbO. The shape of the anode lead wire is not particularly limiting. Preferred shapes include round, oval, rectangular and combinations thereof. The shape of the anode lead wire is preferably chosen for optimum electrical properties.

The construction and manufacture of solid electrolyte capacitors is well documented. In the construction of a solid electrolytic capacitor a valve metal preferably serves as the anode. The anode body can be either a porous pellet, formed by pressing and sintering a high purity powder, or a foil which is etched to provide an increased anode surface area. An oxide of the valve metal is electrolytically formed to cover up to all of the surfaces of the anode and to serve as the dielectric of the capacitor. The solid cathode electrolyte is typically chosen from a very limited class of materials, to include manganese dioxide or electrically conductive organic materials including intrinsically conductive polymers, such as polyaniline, polypyrol, polythiophene and their derivatives. The solid cathode electrolyte is applied so that it covers all dielectric surfaces and is in direct intimate contact with the dielectric. In addition to the solid electrolyte, the cathodic layer of a solid electrolyte capacitor typically consists of several layers which are external to the anode body. In the case of surface mount constructions these layers typically include: a carbon layer; a cathode conductive layer which may be a layer containing a highly conductive metal, typically silver, bound in a polymer or resin matrix; and a conductive adhesive layer such as silver filled adhesive. The layers including the solid cathode electrolyte, conductive adhesive and layers there between are referred to collectively herein as the cathode which typically includes multiple interlayers designed to allow adhesion on one face to the dielectric and on the other face to the cathode lead. A highly conductive metal lead frame is often used as a cathode lead for negative termination. The various layers connect the solid electrolyte to the outside circuit and also serve to protect the dielectric from thermo-mechanical damage that may occur during subsequent processing, board mounting, or customer use.

While described and illustrated as a conductive cathode layer on a solid cathode electrolytic capacitor the conductive coating can be applied on any surface wherein conductive properties are desired. The conductive coating is particularly suitable for use in instances where a conductive coating is required which can withstand humid conditions.

Preparation of PEDOT-PSSA and Conductive Polymer Dispersion A&B

A 4 L plastic jar, provided with a cooling jacket, was initially charged with 125 g of PSSA, 2531 g of DI water, 28.5 g of 1% iron(III) sulphate, and 21.5 g of sodium peroxodisulphate. The contents were mixed using a rotor-stator mixing system with perforated stator screen with a round hole size diameter of 1.6 mm. Subsequently, 11.25 g of 3,4-ethylenedioxythiophene (PEDOT) was added dropwise. The reaction mixture was sheared continuously with a shear speed of 8000 RPM with the rotor-stator mixing system for an additional 23 hours. The dispersion was treated with cationic and anionic exchange resin and filtered to get PEDOT-PSSA base slurry.

Conductive Polymer Dispersion A

To 120 g of the PEDOT-PSSA conductive polymer was added 4.8 g of DMSO, 6 g of water, 0.48 g of 3-glycidoxypropyltrimethoxysilane and 1.44 g of epoxy compound as described in U.S. Publ. Pat. Appl. No. 2015/0029642, followed by mixing in a cylinder container on a roller overnight.

Conductive Polymer Dispersion B

To 120 g of the PEDOT-PSSA conductive polymer was added 4.8 g of DMSO, 6 g of water, 0.48 g of 3-glycidoxypropyltrimethoxysilane and 1.44 g of linear hyperbranched binder as described in U.S. Publ. Pat. Appl. No. 2014/0160632, followed by mixing in a cylinder container on a roller overnight.

Conductive Polymer Dispersion C

To 120 g of the PEDOT-PSSA conductive polymer was added 4.8 g of DMSO, 6 g of water, 1.44 g of epoxy compound as described in U.S. Publ. Pat. Appl. No. 2015/0029642 and 0.12 g of Dynol®604, followed by mixing in a cylinder container on a roller overnight.

Conductive Polymer Dispersion D

To 60 g of Conductive Polymer Dispersion C was added 6 g of monoamine-weak acid combination Solution 4 (see below), followed by mixing in a cylinder container on a roller overnight.

Preparation of Amine-Acid Coverage Enhancing Agent Solutions

Solution 1

To 26.51 g of ammonium hydroxide solution in water (10%) were added 88.9 g of DI water and 4.549 g of acetic acid. The pH of the solution was 9.67.

Solution 2

To 4.814 g of Tris(hydroxymethyl)aminomethane (THMAM) were added 112.8 g of DI water and 2.386 g of acetic acid. The pH of the solution was 6.21.

Solution 3

To 2.697 g of Tris(hydroxymethyl)aminomethane (THMAM) were added 112.8 g of DI water and 4.503 g of sebacic acid. The pH of the solution was 5.52.

Solution 4

To 4.346 g of Triethanolamine (TEA) were added 112.8 g of DI water and 2.854 g of phosphoric acid. The pH of the solution was 3.

Solution 5

To 2.634 g of Tris(hydroxymethyl)aminomethane (THMAM) were added 112.8 g of DI water and 4.566 g of citric acid. The pH of the solution was 3.47.

Solution 6

To 3.785 g of Triethanolamine (TEA) were added 92 g of DI water and 4.215 g of phthalic acid. The pH of the solution was 3.92.

Solution 7

To 2.394 g of Triethanolamine (TEA) were added 92 g of DI water and 3.246 g of sebacic acid. The pH of the solution was 5.76.

Solution 8

To 3.517 g of Triethanolamine (TEA) were added 92 g of DI water and 4.583 g of p-toluene sulfonic acid. The pH of the solution was 2.42.

Solution 9

To 2.001 g of Ethylenediamine (EDA) were added 94 g of DI water and 3.999 g of acetic acid.

Solution 10

To 2.281 g of Ethylenediamine (EDA) were added 92 g of DI water and 3.719 g of p-toluene sulfonic acid.

Comparative Example 1

A series of tantalum anodes (68 microfarads, 16V) were prepared. The tantalum was anodized to form a dielectric on the tantalum anode. The anodized anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodized anodes. This process was repeated until a sufficient thickness was achieved. Conductive Polymer Dispersion A was applied to form an external polymer layer. After drying, another conductive polymer layer was applied and this was repeated 5 times, followed by sequential coating of a graphite layer and a silver layer to produce a solid electrolytic capacitor. Parts were assembled, packaged and surface mounted. ESR was measured before and after surface mount. The SEM coverage is shown in FIG. 4.

Inventive Example 1

A series of tantalum anodes (68 microfarads, 16V) were prepared. The tantalum was anodized to form a dielectric on the tantalum anode. The anodized tantalum anode thus formed was dipped into a solution of iron (III) toluenesulfonate oxidant for 1 minute and sequentially dipped into ethyldioxythiophene monomer for 1 minute. The coated anodized tantalum anodes were washed to remove excess monomer and by-products of the reactions after the completion of 60 minutes polymerization, which formed a thin layer of conductive polymer (PEDOT) on the dielectric of the anodes. This process was repeated until a sufficient thickness was achieved. Conductive Polymer Dispersion A was applied to form an external polymer layer. After drying, alternating layers of monoamine-weak acid combination Solution 1 and Conductive Polymer Dispersion A were applied and repeated 5 times, followed by sequential coating of a graphite layer and a silver layer to produce a solid electrolytic capacitor. Parts were assembled, packaged and surface mounted. ESR was measured before and after surface mount. The SEM coverage is shown in FIG. 5.

Inventive Example 2

Figure 6:
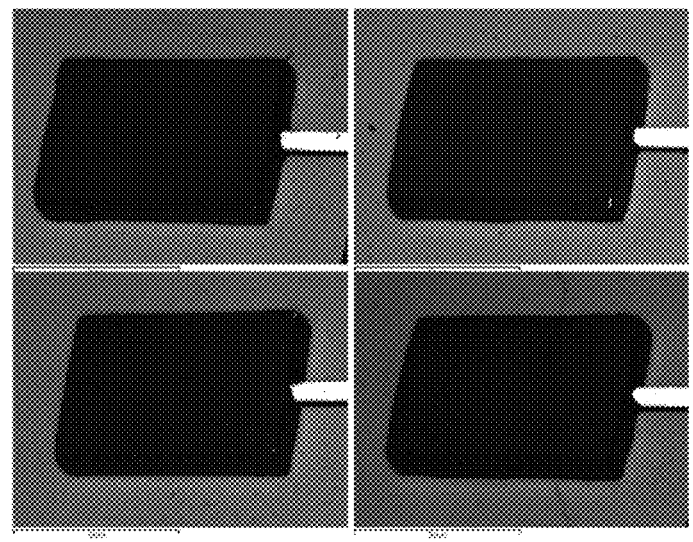
FIG. 6 illustrates the polymer coverage with an inventive example.

A series of tantalum anodes (68 microfarads, 16V) were prepared using the process in Inventive Example 1, except that the monoamine-weak acid solution used was Solution 2. The SEM coverage is shown in FIG. 6 (Top Left).

Inventive Example 3

A series of tantalum anodes (68 microfarads, 16V) were prepared using the process in Inventive Example 1, except that the monoamine-weak acid solution used was Solution 3. The SEM coverage is shown in FIG. 6 (Top Right).

Inventive Example 4

A series of tantalum anodes (68 microfarads, 16V) were prepared using the process in Inventive Example 1, except that the monoamine-weak acid solution used was Solution 4. The SEM coverage is shown in FIG. 6 (Bottom Left).

Inventive Example 5

A series of tantalum anodes (68 microfarads, 16V) were prepared using the process in Inventive Example 1, except that the monoamine-weak acid solution used was Solution 5. The SEM coverage is shown in FIG. 6 (Bottom Right).

As shown by Comparative Example 1 and Inventive Examples 1-5, represented in FIG. 4 vs. FIGS. 5 and 6, all of these monoamine-weak acid combinations showed edge and coverage enhancing properties even though monoamine cannot crosslink the conductive polymer dispersion. The pH of the monoamine-weak acid combinations used are all within the range of about 3 to about 9.7. The results of Comparative Example 1 and Inventive Examples 1-5 are tabulated in Table 1.

TABLE 1

Corner and Edge Coverage

| | |
|---|---|
| Inventive Example 1 | Top edges and top corners exposed |
| Inventive Example 2 | Complete |
| Inventive Example 3 | One corner exposed |
| Inventive Example 4 | One top corner barely visible |
| Inventive Example 5 | Complete |
| Comparative Example 1 | Top/side/bottom edges and all corners exposed |

Comparative Example 2

Figure 7:
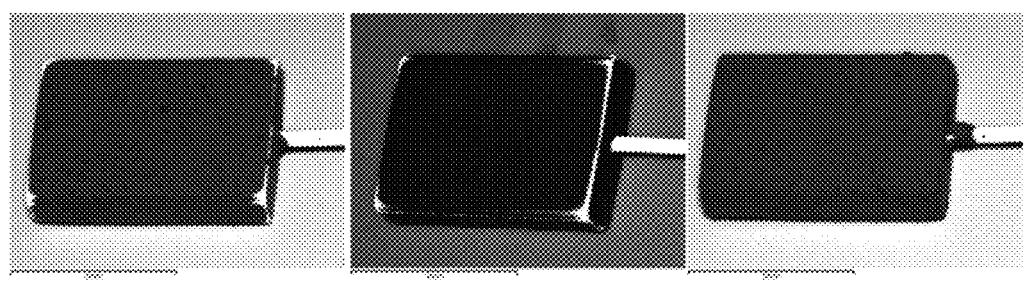
FIG. 7 illustrates the polymer coverage of Comparative Example 2, Comparative Example 4 and Inventive Example 6.

A series of tantalum anodes (33 microfarads, 25V) were prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes of polymerization, thereby forming a thin layer of conductive polymer (PEDOT) on the dielectric of the anodes. This process was repeated until a sufficient thickness was achieved. Conductive Polymer Dispersion B was applied to form an external polymer layer. After drying, alternating layers of a monoamine-strong acid combination Solution 8 and Conductive Polymer Dispersion B were applied and repeated 6 times, followed by sequential coating of a graphite layer and a silver layer to produce a solid electrolytic capacitor. Parts were assembled, packaged and surface mounted. ESR was measured before and after surface mount. The SEM coverage is shown in FIG. 7 (Left).

Comparative Example 3

A series of tantalum anodes (33 microfarads, 25V) were prepared as described in Comparative Example 2, except for that the monoamine-strong acid combination solution was replaced by a commercially available decanediamine toluenesulfonate crosslinker solution, available as Clevios® K Primer. Visual inspection under optical microscope revealed that all corners and edges were completely covered.

Comparative Example 4

A series of tantalum anodes (33 microfarads, 25V) were prepared as described in comparative Example 2, except for that no crosslinker solution was used between external slurry layers. The SEM coverage is shown in FIG. 7 (Middle).

Inventive Example 6

A series of tantalum anodes (33 microfarads, 25V) were prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes of polymerization, thereby forming a thin layer of conductive polymer (PEDOT) on the dielectric of the anodes. This process was repeated until a sufficient thickness was achieved. Conductive Polymer Dispersion B was applied to form an external polymer layer. After drying, alternating layers of monoamine-weak acid combination Solution 6 and Conductive Polymer Dispersion B were applied and repeated 6 times, followed by sequential coating of a graphite layer and a silver layer to produce a solid electrolytic capacitor. Parts were assembled, packaged and surface mounted. ESR was measured before and after surface mount. The SEM coverage is shown in FIG. 7 (Right).

Inventive Example 7

A series of tantalum anodes (33 microfarads, 25V) were prepared using the process in Inventive Example 6, except that the monoamine-weak acid combination Solution 7 is used. The SEM image of anodes after polymer dispersion coating was not taken but visual inspection under optical microscope revealed that all corners and edges were completely covered. The results of Comparative Examples 3 and 4 and Inventive Examples 6 and 7 are tabulated in Table 2.

TABLE 2

| | Corner and Edge Coverage | % Anode above leakage limit |
|---|---|---|
| Inventive Example 6 | Complete | 0 |
| Inventive Example 7 | Complete | 0 |
| Comparative Example 2 | Top/bottom edges and all corners exposed | 47.5% |
| Comparative Example 3 | Complete | 22.5% |
| Comparative Example 4 | Top/side bottom edges and all corners exposed | Not tested |

Figure 8:
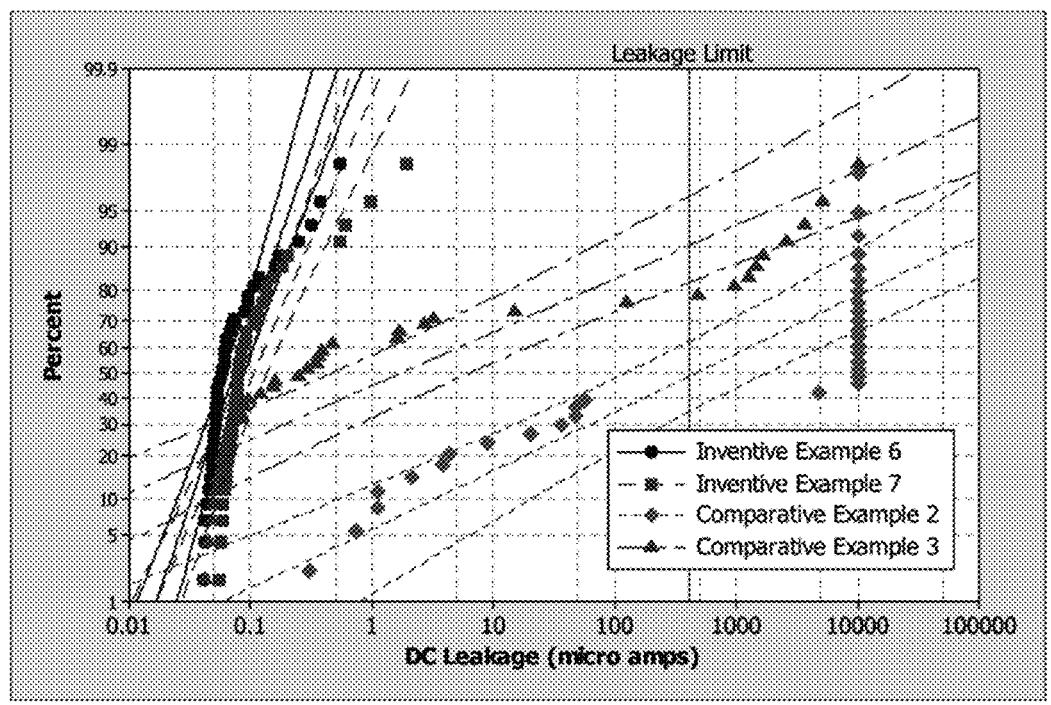
FIG. 8 illustrates the DC leakage of Inventive Examples 6 and 7 vs. Comparative Examples 2 and 3 after humidity treatment.

The capacitors prepared in the Inventive Examples 6 and 7 and Comparative Examples 2 and 3 were mounted onto a circuit board and placed in an environmental chamber set at 121° C. and 85% RH under 1.76 atm pressure for 21 hrs. The rated working voltage of 25V was applied to the capacitors. After the humidity treatment was complete, the capacitors were allowed to cool then they were retested. FIG. 8 graphically illustrates the DC leakage data after the humidity treatment. Comparative Example 2 used a monoamine-toluene sulfonic acid compound, which showed poor polymer coverage and a large number of electrical short failures after humidity treatment. Comparative Example 3 prepared with commercial diamine-toluene sulfonic acid compound available as Clevios® K Primer, demonstrated good coverage but performed very poorly in leakage testing after humidity treatment. The Inventive Examples 6 and 7 showed much lower DC leakage than Comparative Examples 2 and 3 even though the anode did not go through a water wash cycle to remove any ionic species after polymer layer was applied. Clearly, the current invention makes it possible to eliminate the water wash process without adversely affecting the performance.

Inventive Examples 6 and 7 when compared to Comparative Example 4 clearly illustrated the edge and coverage enhancing property of monoamine-weak acid compounds. When Inventive Example 6 is compared with Comparative Example 2 & 3, the result is very surprising. U.S. Pat. No. 8,882,856 suggests strong acid counter ions, such as toluene sulfonic acid, for diamine crosslinkers. However, in our result, toluene sulfonic acid is a very poor counter acid for the monoamine coverage enhancing agent, and the coverage is much worse than with the inventive monoamine-weak acid combination.

Comparative Example 5

Figure 9:
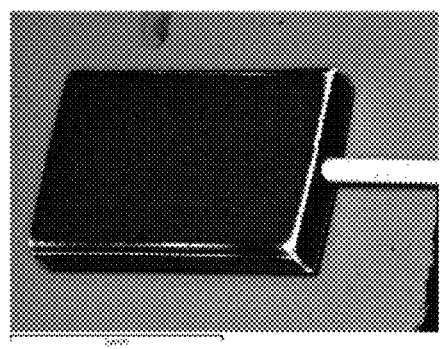
FIG. 9 illustrates the polymer coverage with a prior art nonionic primer.

A series of tantalum anodes (68 microfarads, 16V) were prepared using the process in Inventive Example 1, except that the monoamine-weak acid solution is replaced by 6% Glycerol solution in water. The SEM coverage is shown in FIG. 9.

Comparative Example 6

Figure 10:
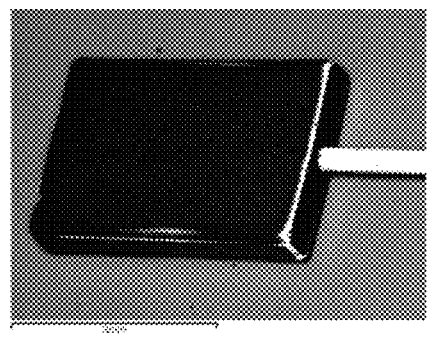
FIG. 10 illustrates the polymer coverage with a prior art primer solution.

A series of tantalum anodes (68 microfarads, 16V) were prepared using the process in Inventive Example 1, except that the monoamine-weak acid solution is replaced a mixture of 4.011% Glycerol and 1.989% acetic acid solution in water. The SEM coverage is shown in FIG. 10.

U.S. Pat. No. 8,771,381 teaches the use of nonionic polyols in between conductive polymer dispersion layers to improve polymer corner and edge coverage. Since some of the monoamine-weak acid compounds disclosed in this patent application contain hydroxyl groups, it is important to understand if the coverage enhancing effect is merely due to these hydroxyl groups. The result in Table 3 suggests that although glycerol improves the edge coverage slightly, it is not as effective as Inventive Example 1, which is one of the simplest monoamine-weak acid compounds. Having additional hydroxyl groups on the amine did improve the coverage even more, as shown by Inventive Example 2. Monoamines with hydroxyl groups are therefore more preferred.

TABLE 3

| | Corner and Edge Coverage |
|---|---|
| Inventive Example 1 | Top edges and top corners exposed |
| Inventive Example 2 | Complete |
| Comparative Example 1 | Top/side/bottom edges and all corners exposed |
| Comparative Example 5 | Top/side/part of bottom edges and top corners exposed |
| Comparative Example 6 | Top/side/part of bottom edges and top corners exposed |

Comparative Example 7

In a 125 ml bottle were added 80 g of commercial conductive polymer dispersion, available as Clevios® KV2 from Heraeus, and 1.6 g of deionized water. The mixture was mixed by rolling on a roller at 60 rpm overnight. The viscosity was measured at 23° C. with a Brookfield RV Viscometer at 100 rpm using Spindle #3. The results are tabulated in Table 4.

Comparative Example 8

In a 125 ml bottle were added 80 g of commercial conductive polymer dispersion, available as Clevios® KV2 from Heraeus, and 1.6 g of Solution 9. The mixture was mixed by rolling on a roller at 60 rpm overnight. The viscosity was measured at 23° C. with a Brookfield RV Viscometer at 100 rpm using Spindle #3. The results are tabulated in Table 4.

Comparative Example 9

In a 125 ml bottle were added 80 g of commercial conductive polymer dispersion, available as Clevios® KV2 from Heraeus, and 1.6 g of Solution 10. The mixture was mixed by rolling on a roller at 60 rpm overnight. The viscosity was measured at 23° C. with a Brookfield RV Viscometer at 100 rpm using Spindle #3. The results are tabulated in Table 4.

Comparative Example 10

Figure 11:
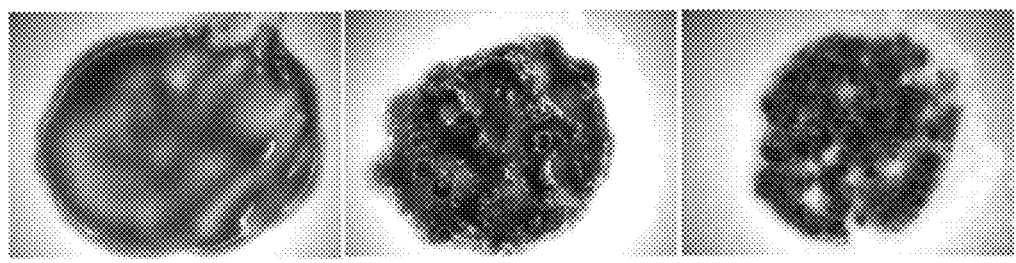
FIG. 11 illustrates optical images of Inventive Example 9 and Comparative Examples 10 and 11.

In a 125 ml bottle were added 80 g of commercial conductive polymer dispersion, available as Clevios® KV2 from Heraeus, and 8 g of Solution 9. Agglomeration of the polymer dispersion occurred instantly. Optical image of the mixture on a glass slide is shown in FIG. 11 (Middle).

Comparative Example 11

In a 125 ml bottle were added 80 g of commercial conductive polymer dispersion, available as Clevios® KV2 from Heraeus, and 8 g of Solution 10. The mixture was mixed by rolling on a roller at 60 rpm overnight. Agglomeration of the polymer dispersion occurred instantly. Optical image of the mixture on a glass slide is shown in FIG. 11 (Right).

Inventive Example 8

In a 125 ml bottle were added 80 g of commercial conductive polymer dispersion, available as Clevios® KV2 from Heraeus, and 1.6 g of Solution 1. The mixture was mixed by rolling on a roller at 60 rpm overnight. The viscosity was measured at 23° C. with a Brookfield RV Viscometer at 100 rpm using Spindle #3. The results are tabulated in Table 4.

Inventive Example 9

In a 125 ml bottle were added 80 g of commercial conductive polymer dispersion, available as Clevios® KV2 from Heraeus, and 8 g of Solution 1. No agglomeration was observed. Optical image of the mixture on a glass slide is shown in FIG. 11 (Left).

Comparative Examples 8 and 9 both used diamine crosslinkers and both led to viscosity increase of conductive polymer dispersion, which is attributed to the crosslinking effect of the diamines. When the amount of the crosslinker increased even more, they caused severe agglomeration of the conductive polymer dispersion as shown by Comparative Examples 10 and 11. Inventive Examples 8 and 9 proved that the addition of monoamine-acid combination to conductive polymer dispersion did not cause any viscosity increase or agglomeration at all. This is clearly an advantage of the current invention over the prior arts involving polyvalent crosslinkers.

TABLE 4

| | Amine-Acid | Viscosity after mixing (cPs) |
|---|---|---|
| Inventive Example 8 | Monoamine-weak acid | 360 |
| Comparative Example 7 | DI water | 391 |
| Comparative Example 8 | Diamine-weak acid | 409 |
| Comparative Example 9 | Diamine-strong acid | 431 |

Inventive Example 10

A series of tantalum anodes (33 microfarads, 25V) were prepared using the process in Comparative Example 3, except that 0.2% of monoamine-weak acid compound from Solution 6 was added to Conductive Polymer Dispersion B before dipping process. The samples were observed after each application with the results tabulated in Table 5.

Comparative Example 12

Figure 12:
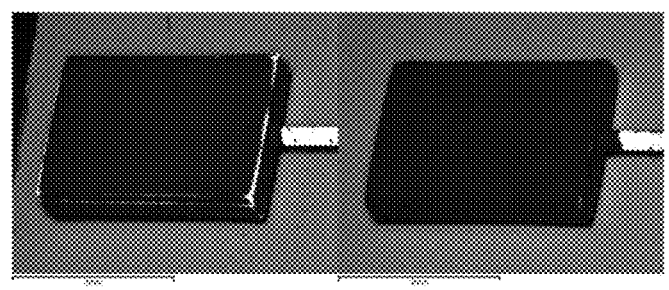
FIG. 12 illustrates the polymer coverage of Comparative Example 12 and Inventive Example 11.

A series of tantalum anodes (68 microfarads, 16V) were prepared using the process in Comparative 1, except that Conductive Polymer Dispersion A is replaced by Conductive Polymer Dispersion C. The SEM coverage is shown in FIG. 12 (Left).

Inventive Example 11

A series of tantalum anodes (68 microfarads, 16V) were prepared using the process in Comparative 1, except that Conductive Polymer Dispersion A is replaced by Conductive Polymer Dispersion D. The SEM coverage is shown in FIG. 12 (Right).

Because the monoamine-weak acid combinations do not crosslink the conductive polymer dispersion, they are not required to be applied separately from the conductive polymer layers as the diamine or polyamine crosslinkers in prior art. Inventive Example 10 & 11 demonstrated that the monoamine-weak acid combination can be used as an additive in the conductive polymer dispersion to improve the edge and corner coverage as demonstrated in Table 5 and FIG. 12.

TABLE 5 of Exposed Corners after Each Applied Polymer Layer

| | 2nd layer | 3rd layer | 4th layer | 5th layer |
|---|---|---|---|---|
| Inventive Example 10 | 3 | 1 | 0 | 0 |
| Comparative Example 3 | 4 | 2 | 1 | 0 |

Comparative Example 13

Aluminum foil coupons with etched porous structure were anodically formed to 11 volts for a rated working voltage of 6.3 volts. They were immersed in a solution of ethylenedioxythiophene (EDT) in isopropanol. The isopropanol was evaporated at 40° C. for 2 minutes. The coupons were then dipped in an aqueous solution of ammonium persulfate (APS) with dispersed particles of sodium anthroquinone sulfonate (SAQS). EDT in contact with APS and SAQS was allowed to polymerize for 6 minutes. This chemical oxidative polymerization step was repeated multiple times to build the conductive polymer on the surface inside the pores. The anodes were dip-coated using Conductive Polymer Dispersion C to form the first layer of an external polymer. They were then immersed in a commercially available decanediamine toluenesulfonate crosslinker solution, Clevios® K Primer, and dried, followed by dip-coating of Conductive Polymer Dispersion C. The crosslinker solution and conductive polymer dispersion dipping were repeated one more time, followed by carbon and silver containing conductive coatings.

Inventive Example 12

Aluminum anodes were prepared with the same procedure as outlined in Comparative Example 13 except that the crosslinker solution was replaced by the monoamine-weak acid combination Solution 3.

Figure 13:
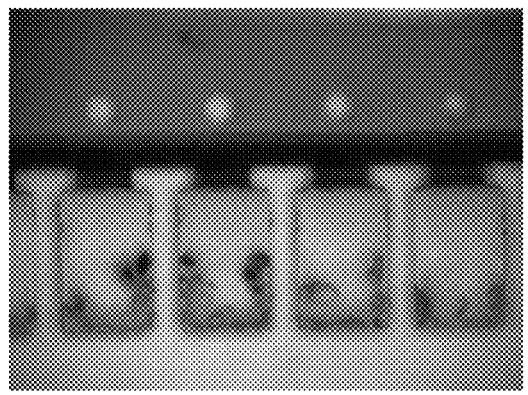
FIG. 13 illustrates corrosion with a prior art crosslinker solution.
Figure 14:
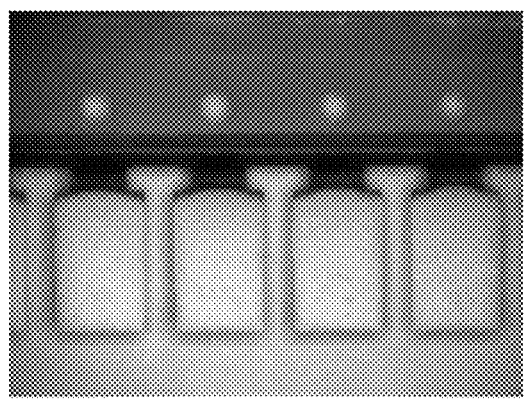
FIG. 14 illustrates no corrosion with an inventive coverage enhancing agent.

The anodes prepared in Comparative Example 13 and Inventive Example 12 were placed in an environmental chamber set at 121° C. and 85% RH under 1.76 atm pressure for 21 hours. After the humidity treatment, anodes prepared by the Inventive Example 12 showed no sign of corrosion as seen in FIG. 14 while anodes made by the Comparative Example 13 showed severe corrosion as seen in FIG. 13. None of these parts were water washed to remove any ionic species. This result clearly demonstrated the advantage of our invention over some of the prior arts that involve strong ionic species.

Test 1

A series of capacitors were formed on an aluminum anode with aluminum oxide dielectric. The dielectric was coated with a commercially available primer comprising dodecane diamine and toluene sulphonic acid available as Clevios® K Primer W from Heraeus. A layer of intrinsically conducting 3,4-ethylenedioxythiophene polymer available as Clevios® KV2 from Heraeus was formed on the dried primer. The capacitor was tested for ESR, the ratio of edge to body coating thickness and b-HAST. The results are presented in Table 1 as Comparative 14.

Test 2

A series of capacitors were formed on an aluminum anode with aluminum oxide dielectric. The dielectric was coated with a primer comprising dodecane diamine and 1,2,3,4-butanetetracarboxylic acid in a 1:1 molar ratio. Sequential layers of intrinsically conducting 3,4-ethylenedioxythiophene polymer available as Clevios® KV2 from Heraeus were formed on the dried primer. The capacitor was tested for ESR, the ratio of edge to body coating thickness and b-HAST. The results are presented in Table 6 as Inventive 13.

TABLE 6

| Sample | Solid ESR (Ohms) | Edge/Body ratio | b-HAST |
|---|---|---|---|
| Comparative 14 | 0.025 | 0.7 | fail |
| Inventive 13 | 0.050 | 0.9 | pass |

As the results of Table 6 indicate Inventive 13 has superior thickness uniformity with a near equal thickness at the edges and the body. The Inventive example 13 also has superior results in accelerated reliability test. The inventive example 13 suffers from an increase in ESR.

Test 3

A series of capacitors from Comparative 14 and Inventive 13 were separated and subjected to 260° C. infrared heat treatment and to an oven heat treatment at 125° C., 150° C., and 175° C. for 2 hours. Under infrared heating conditions both samples demonstrated a slight increase in ESR. No obvious insulation layer was observed in cross-sectional views. A series of capacitors was also heated at 85° C. and 85% humidity at rated voltage and without voltage. ESR did not decrease.

Test 4

A series of capacitors from Comparative 14 and Inventive 13 were separated and subjected to treatment at 121° C. and 85% relative humidity at rated voltage and under identical conditions without voltage. Inventive 13 demonstrated a significant decrease in ESR from a mean of about 0.050 Ohms to a mean of about 0.020 Ohms which is comparable to Comparative 14 without the treatment. Furthermore, in subsequent dry heating at 125° C. for 24 hours leakage current after the treatment, both with and without voltage, was stable and acceptable.

Test 5

A series of capacitors from Comparative 14 and Inventive 13 were prepared, with the exception that two layers of intrinsically conductive polymer were applied sequentially.

The samples were separated and subjected to moist treatment at 121° C. and 85% relative humidity at rated voltage and under identical conditions without voltage. Inventive 13 demonstrated a significant decrease in ESR from a mean of about 0.050 Ohms to a mean of about 0.020 Ohms which is comparable to Comparative 1 without moist treatment. In further processing the ESR remained stable post molding. The finished capacitors with encapsulation were tested for 21 hours under HAST condition. Leakage current was stable and acceptable. In contrast, capacitors made from Comparative 14 showed severe increase in leakage current.

Another group of finished capacitors with encapsulation were passed through a Pb free SMT reflow with a peak temperature of 260° C. five times. ESR was stable and acceptable. In comparison, capacitors made from Comparative 14 showed significant increase in ESR. Table 7 lists the ESR values in Ohms for parts made from Comparative 14 and Inventive 13 from different tests.

TABLE 2

| Sample | Post molding | End of line | 5 Pass Reflow | Post b-HAST |
|---|---|---|---|---|
| Comparative 14 | 0.014 | 0.023 | 0.036 | 0.143 |
| Inventive 13 | 0.011 | 0.014 | 0.016 | 0.022 |

As realized from the examples, moist treatment of layers of an intrinsically conducting polymer over a primer, particularly a weak ionic counterion, results in improved interlayer adhesion. Subsequent heating even further improves the ultimate capacitor as evidenced by aging characteristics.
Test 6

A series of capacitors from Comparative 14 and Inventive 13 were separated and subjected to treatment by dipping in glycerol for 5 mins followed by drying at 130° C. for 30 mins. Inventive 13 demonstrated a significant decrease in ESR from a mean of about 0.050 Ohms to a mean of about 0.026 Ohms which is comparable to Comparative 14 without the treatment.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A method for forming a capacitor comprising: providing an anode; forming a dielectric on said anode; and forming a cathode layer over said dielectric by: applying an amine; applying a weak acid; and applying a conductive polymer; wherein said monoamine and said weak acid do not crosslink said conductive polymer.

2. The method for forming a capacitor of claim 1 wherein at least two of said amine, said weak acid and said conductive polymer are combined.

3. The method for forming a capacitor of claim 2 wherein said amine and said weak acid are combined.

4. The method of forming a capacitor of claim 3 wherein said combined amine and weak acid are applied in a solvent.

5. The method of forming a capacitor of claim 3 wherein said solvent further comprises at least one additive selected from the group consisting of a crosslinker, a binder, a surfactant, and an adhesion promoter.

6. The method for forming a capacitor of claim 3 wherein said conductive polymer is applied either before or after said combined amine and said weak acid.

7. The method for forming a capacitor of claim 1 wherein said amine, said weak acid and said conductive polymer are applied separately.

8. The method for forming a capacitor of claim 1 wherein said amine and said conductive polymer are applied prior to said applying said weak acid.

9. The method for forming a capacitor of claim 8 wherein said amine and said conductive polymer are applied in alternating layers prior to said applying said weak acid.

10. The method for forming a capacitor of claim 1 wherein said weak acid has a pKa of at least 0.25 to no more than 10 in water.

11. The method for forming a capacitor of claim 10 wherein said weak acid has a pKa of at least 0.25 to no more than 10 in water measured as a monomer.

12. The method for forming a capacitor of claim 10 wherein said weak acid has a pKa of at least 1 to no more than 7 in water.

13. The method for forming a capacitor of claim 10 wherein said weak acid has a pKa of at least 2 to no more than 6 in water.

14. The method for forming a capacitor of claim 10 wherein said weak acid is selected from the group consisting of carbonic acid, boric acid, phosphoric acid, phosphonic acids, carboxylic acids, acrylic acid, benzoic acid, malonic acid, maleic acid, succinic acid, glutaric acid, adipic acid, sebacic acid, phenol, benzoic acid, phthalic acid, 2,2-bis (hydroxymethyl)propionic acid, dimethylolpropionic acid, citric acid, trimesic acid, butanetetracarboxylic acid and polyacrylic acid.

15. The method for forming a capacitor of claim 14 wherein said weak acid is selected from the group consisting of phosphoric acid, and phosphonic acids.

16. The method for forming a capacitor of claim 1 wherein said cathode layer further comprises a carboxylic acid.

17. The method for forming a capacitor of claim 16 wherein said carboxylic acid comprises multiple carboxylic acid groups.

18. The method for forming a capacitor of claim 1 wherein said amine comprises at least one hydroxyl group.

19. The method for forming a capacitor of claim 1 wherein said amine has a pKa in water of at least 30.

20. The method for forming a capacitor of claim 1 wherein said amine is a monoamine.

21. The method for forming a capacitor of claim 20 wherein said monoamine is an amino acid.

22. The method for forming a capacitor of claim 21 wherein said monoamine is selected from the group consisting of glycine, alanine and lysine.

23. The method for forming a capacitor of claim 20 wherein said monoamine is defined by a formula selected from the group consisting of: $R^1NH_2$, $R^1R^2NH$, and $R^1R^2R^3N$ wherein $R^1$, $R^2$, $R^3$ independently are selected from alkyl, substituted alkyl, aromatic and substituted armoatic with the proviso that none of $R^1$, $R^2$ or $R^3$ are an amine, a phosphonium, a sulfonium or any strong acid groups that has a pKa below 0.25 in water.

24. The method for forming a capacitor of claim 23 wherein said $R^1$, $R^2$, $R^3$ are independently substituted with at least one group selected from the group consisting of hydroxy, thiol, sulfide, epoxy, ether, carbonyl, ester, acetal, amide, imide, nitrate, phosphonate, phosphate and carboxylic.

25. The method for forming a capacitor of claim 24 wherein said $R^1$, $R^2$, $R^3$ are independently substituted with at least one group selected from the group consisting of hydroxy, thiol, sulfide, epoxy, ether, carbonyl, ester, acetal, amide, imide, nitrate, phosphonate and phosphate.

26. The method for forming a capacitor of claim 24 wherein said monoamine comprises at least one hydroxy group.

27. The method for forming a capacitor of claim 20 wherein said monoamine is selected from the group consisting of: ammonia, ethylamine, diethylamine, triethylamine, propylamine, dipropylamine, tripropylamine, isopropylamine, diisopropylamine, butylamine, tripropylamine, dibutylamine, tributylamine, isobutylamine, diisobutylamine, triisobutylamine, methylethylamine, pentylamine, hexylamine, octylamine, decylamine, allylamine, ethanolamine, diethanolamine, triethanolamine, methylethanolamine, butylethanolamine, cyclohexylethanolamine, cyclohexyldiethanolamine, N-ethylethanolamine, N-propylethanol amine, tris(hydroxymethyl)aminomethane, 3-amino-1-propanol, amino-2-propanol, diisopropanolamine, triisopropanolamine, 5-amino-1-pentanol, 6-amino-1-hexanol, pyridine, aniline, methyl-aniline, nitro-aniline, 1-naphthylamine, 2-naphthylamine, and glucosamine.

28. The method for forming a capacitor of claim 1 wherein said amine is selected from the group consisting of diamine, triamine, oligoamine and derivatives thereof.

29. The method for forming a capacitor of claim 28 wherein said amine is selected from the group consisting of α,ω-diamines;
linear aliphatic α,ω-diamines; amides; aliphatic amines; aromatic amines; aromatic triamines; polymeric amines; and polyethers and imidazole derivatives.

30. The method for forming a capacitor of claim 29 wherein said amine comprises at least two amino groups.

31. The method for forming a capacitor of claim 29 wherein said amine is selected from the group consisting of 1,4-diaminocyclohexane 1,4-bis aminomethyl(cyclohexane);

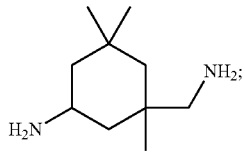

ethylenediamine, 1,6-hexanediamine, 1,7-heptanediamine, 1,8-octanediamine, 1,9-nonanediamine, 1,10-decanediamine or 1,12-dodecanediamine N,N-dimethylethylenediamine, N,N,N'N'tetramethyl-1,4,butanediamine, N,N,N,N'N'N-hexamethylhexanemethylene-diammonium dibromide, piperazine, 1,4-diazabicyclo[2.2.2]octane, N,N,N'N-tetrakis(2-hydroxypropyl)ethylenediamine, N-[3-(trimethoxysilyl)propyl]ethylenediamine; 1,4-bis(3-aminopropyl)piperazine; N,N'-diacetyl-1,6-hexanediamine; N,N,N'N'-tetraacetylethylene-diamine; 1,4-diformylpiperazines, N,N'-ethylenebis(stearamide); 1,4-bis(3-aminopropyl)piperazine; N-(6-aminohexyl)-1,6-diaminohexane; N-(3-aminopropyl)-1,4-diaminobutanel 3-[2-(2-aminoethylamino)ethyleneamino]propyltrimethoxysilane; brilliant green; 4,4'-methylenebis(N,N-diglycidylaniline); o-phenylene-di-amine; m-phenylenediamine, p-phenylenediamine; 1,5-diaminonaphthalene; 1,8-diaminonaphthalene; 2,3-diaminonaphthalene; 3-aminophenyl sulfone; 4-aminophenyl sulfone; 4-aminophenyl ether; 3-3'-diaminobenzidine; 2-(4-aminophenyl)ethylamine; 4,4'-methylenendianiline; 2,6-diamiotoluene, N,N,N'N'-tetramethyl-p-phenylenediamine; 4,4'-bis(diethylamino)benzophenone; 4,4'-bis(dimethyl-amino)benzhydrol; 3,3',5,5'-tetramethyl-benzidin; Auramine O; Rubine S; m-xylenediamine; phthalein; complexone; Brilliant Blue G; folic acid; 4,4',4''-methyliditetris (N,N-dimethylaniline); poly(propylene glycol)bis(2-aminopropyl) ether, polyethyleneimine and poly(allylamine), ethoxylated polyethyleimine and NH$_2$—(CH$_2$)$_x$(CH$_2$CH$_2$O)$_y$(CH$_2$)$_z$—NH$_2$, wherein x and z are an integer from 0 to 3 and y is an integer from 2 to 8.

32. The method for forming a capacitor of claim 1 wherein said anode is a valve metal or a conductive oxide of said valve metal.

33. The method for forming a capacitor of claim 32 wherein said valve metal is selected from the group consisting of Al, W, Ta, Nb, Ti, Zr and Hf.

34. The method for forming a capacitor of claim 33 wherein said anode is selected from the group consisting of Al, Ta, Nb and NbO.

35. The method for forming a capacitor of claim 1 wherein said dielectric is an oxide of said anode.

36. The method for forming a capacitor of claim 1 wherein said conductive polymer is selected from the group consisting of polypyrrole, polyaniline and polythiophene.

37. The method for forming a capacitor of claim 36 wherein said conductive polymer is poly(3,4-ethylenedioxythiophene).

38. The method for forming a capacitor of claim 1 further comprises a treatment process at a temperature of at least 50° C. to no more than 200° C., at a relative humidity of at least 25% up to 100%.

39. The method for forming a capacitor of claim 1 further comprises a treatment process with a solvent or mixture of solvents.

40. The method for forming a capacitor of claim 39 wherein said solvent is selected from water and polar solvents miscible with water.

41. The method of forming a capacitor of claim 1 wherein a carrying liquid for said conductive polymer is not removed.

42. The method of forming a capacitor of claim 1 further comprising a silane treatment between said forming of said dielectric layer and said forming of said cathode layer.

43. The process for forming a capacitor of claim 1 further comprising applying a primer layer prior to said applying of said first layer of said intrinsically conducting polymer or prior to applying said subsequent layer of said intrinsically conducting polymer.

44. The process for forming a capacitor of claim 43 wherein said primer layer comprises a weak ionic counterion.

45. The process for forming a capacitor of claim 44 said weak counterion has a pKa of at least 0.25 to no more than 6.

46. The process for forming a capacitor of claim 45 wherein said weak counterion has a pKa of at least 2.15 to no more than 6.

47. The process for forming a capacitor of claim 46 wherein said weak ionic counterion comprises multiple carboxylic groups.

48. The process for forming a capacitor of claim 47 wherein said weak ionic counterion comprises 1 to 20 carbons.

49. The process for forming a capacitor of claim 47 wherein said weak ionic counterion is selected from the group consisting of acetic acid, 1,2,3,4-butanetetracarboxylic acid, lysine and butanetetraacetic acid.

50. The process for forming a capacitor of claim 43 wherein said primer layer comprises a cross-linker.

51. A capacitor formed by the method for forming a capacitor of claim 1.

52. A method for forming a capacitor comprising: providing an anode; forming a dielectric on said anode; and forming a cathode layer over said dielectric by: applying an amine; applying a weak acid wherein said weak acid is not a carboxylic acid; and applying a conductive polymer; wherein said monoamine and said weak acid do not cross-link said conductive polymer.

53. A capacitor comprising: an anode; a dielectric at least partially encasing said anode; and
 a cathode on said dielectric wherein said cathode comprises an intrinsically conducting polymer, a weak acid wherein said weak acid is not a carboxylic acid and an amine; wherein said monoamine and said weak acid do not crosslink said conductive polymer.

54. A process for forming a capacitor comprising: providing an anode comprising a dielectric thereon; forming a conductive layer on said dielectric wherein said conductive layer comprises an intrinsically conducting polymer, a weak acid and an amine to form a capacitor precursor; applying at least one subsequent layer of an intrinsically conducting polymer on said first layer from a dispersion; and treating said capacitor precursor at a temperature of at least to no more than at a relative humidity of at least 25% up to 100%; wherein said monoamine and said weak acid do not crosslink said conductive polymer.

55. A process for forming a capacitor comprising: providing an anode comprising a dielectric thereon; applying a first layer on said dielectric wherein said first layer comprises at least one of an intrinsically conducting polymer, a weak acid and an amine to form a capacitor precursor; applying a second layer on said first layer wherein said second layer comprises at least one of said intrinsically conducting polymer, said weak acid and said amine to form a layered structure; fusing said layered structure by:
 swelling said layered structure with a liquid; and at least partially removing said liquid;
 wherein said monoamine and said weak acid do not crosslink said conductive polymer.

* * * * *